United States Patent
Veelaert et al.

(10) Patent No.: US 11,721,028 B2
(45) Date of Patent: Aug. 8, 2023

(54) MOTION SEGMENTATION IN VIDEO FROM NON-STATIONARY CAMERAS

(71) Applicants: UNIVERSITEIT GENT, Ghent (BE); IMEC VZW, Leuven (BE)

(72) Inventors: Peter Veelaert, Ghent (BE); David Van Hamme, Maldegem (BE); Gianni Allebosch, Zelzate (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 132 days.

(21) Appl. No.: 17/057,468

(22) PCT Filed: May 28, 2019

(86) PCT No.: PCT/EP2019/063847
§ 371 (c)(1),
(2) Date: Nov. 20, 2020

(87) PCT Pub. No.: WO2019/229075
PCT Pub. Date: Dec. 5, 2019

(65) Prior Publication Data
US 2021/0192750 A1    Jun. 24, 2021

(30) Foreign Application Priority Data
May 28, 2018   (EP) ..................... 18174476

(51) Int. Cl.
*G06T 7/215*   (2017.01)
*G06T 7/285*   (2017.01)
*G06T 7/174*   (2017.01)

(52) U.S. Cl.
CPC .............. *G06T 7/215* (2017.01); *G06T 7/174* (2017.01); *G06T 7/285* (2017.01); *G06T 2207/10021* (2013.01)

(58) Field of Classification Search
CPC ......... G06T 7/215; G06T 7/174; G06T 7/285; G06T 2207/10021; G06T 2207/30252; G06T 7/194; G06V 20/58; G06V 40/23
See application file for complete search history.

(56) References Cited

U.S. PATENT DOCUMENTS

| | | |
|---|---|---|
| 2008/0089556 A1 | 4/2008 | Salgian et al. |
| 2010/0165123 A1* | 7/2010 | Wei .................... H04N 5/23248 348/208.4 |

(Continued)

OTHER PUBLICATIONS

Depth from Stereo, Fidler, 2015; http://www.cs.toronto.edu/-fidler/slides/2015/CSC420/1ecture12_hres.pdf (Year: 2015).*

(Continued)

*Primary Examiner* — Jianxun Yang
(74) *Attorney, Agent, or Firm* — Workman Nydegger

(57) ABSTRACT

A data processing device for motion segmentation in images obtained by cameras that move in a background environment includes an input for receiving a temporal sequence of images from the cameras and a processor. The processor is adapted for, for at least two images, of the temporal sequence of images, that are obtained by at least two cameras at different points in time, determining epipoles, defining corresponding image regions of limited image disparity due to parallax around the epipoles in the at least two images, and applying a motion segmentation algorithm to the corresponding image regions. Warping is applied to the corresponding image regions to compensate for camera rotation and misalignment beyond a threshold value.

17 Claims, 17 Drawing Sheets

(56) References Cited

U.S. PATENT DOCUMENTS

| | | |
|---|---|---|
| 2012/0050496 A1 | 3/2012 | Nishigaki |
| 2017/0098131 A1 | 4/2017 | Shashua et al. |
| 2017/0287108 A9* | 10/2017 | Livyatan .............. G06K 9/6201 |
| 2017/0352136 A1* | 12/2017 | Uliyar .................... H04N 5/247 |

OTHER PUBLICATIONS

Hartley, "In Defense of the Eight-Point Algorithm," IEEE Transactions on Pattern Analysis and Machine Intelligence, vol. 19, No. 6, Jun. 30, 1997, pp. 580-593.
Yi et al., "Detection of Moving Objects with Non-Stationary Cameras in 5.8ms: Bringing Motion Detection to your Mobile Device," IEEE Conference on Computer Vision and Pattern Recognition Workshops, Jun. 23-28, 2013, pp. 27-34.
Bouwmans, "Traditional and Recent Approaches in Background Modeling for Foreground Detection: An Overview," ScienceDirect, Computer Science Review, vol. 11-12, Apr. 20, 2014, pp. 31-66.
Extended European Search Report and Written Opinion from corresponding Application No. EP18174476.4, dated Nov. 7, 2018.
International Search Report and Written Opinion from PCT Application No. PCT/EP2019/063847, dated Jul. 30, 2019.

\* cited by examiner

↖ 201

↖ 202

↖ 203

↖ 204

↖ 205

↖ 201

↖ 202

↖ 203

↖ 204

↖ 205

↖201

↖202

↖203

↖204

↖205

MOTION SEGMENTATION IN VIDEO FROM NON-STATIONARY CAMERAS

FIELD OF THE INVENTION

The invention relates to the field of computer-implemented motion segmentation in a sequence of image data. More specifically it relates to a device, a system and a method for detecting and/or tracking objects that are moving with respect to a background environment in video data obtained by a plurality of cameras that are also moving relative to the background environment.

BACKGROUND OF THE INVENTION

In technical fields such as vehicle driving assistance and vehicle automation, but not necessarily limited thereto, a need exists for digital vision-based motion segmentation methods, also referred to as foreground/background segmentation, for identifying moving objects, e.g. by identifying their silhouette, in a temporal sequence of images, e.g. in a video sequence. Assistive or autonomous technology for vehicles depends strongly on the precise and reliable detection of moving objects in the driving environment. The fusion of radar, lidar and cameras can be considered as presently still not robust enough to guarantee safety. Lidar is still very expensive, mechanically fragile and has limited resolution, e.g. a maximum of 64 beams, while radar may also lack the required spatial resolution. Prior-art solutions for motion segmentation using cameras on moving vehicles may be too slow and may have unacceptably high miss rates. Therefore, a need exists for a cheap and reliable system for motion segmentation.

For example, one exemplary application may relate to Autonomous Emergency Braking (AEB) and Backup Collision Intervention (BCI). The majority of collisions are known to occur at less than 40 km/h. Typical problems in such applications may arise when a less common road user, such as a scooter, is not detected by an automated system because the recognition of this type of road user was not sufficiently trained by the system. Another typical problem may arise when an object, such as a pedestrian, that is close to the camera is not detected due to partial occlusion. Furthermore, a detection-by-recognition system typically needs to track objects over several frames, before it can decide which objects impose the highest danger, while the highest danger arises from situations where the object appears suddenly and/or at close proximity.

While this can be considered a challenging task when the sequence of images is acquired by a moving camera, as would be typically the case in vehicle assistance or automation tasks, such foreground/background segmentation may be relatively easy for a video sequence captured by a static camera. For example, when a background remains static between different time frames, a motion segmentation algorithm as known in the art can build a detailed background model for each pixel or group of pixels by analysing only a relatively short temporal sequence of images. It is furthermore known in the art, e.g. for motion segmentation of such statically acquired images, that various statistical techniques and processing algorithms can be applied to account for dynamic background effects (or at least dynamic effects to be considered as non-foreground events), such as caused by small camera jitter, changing illumination and/or continuous changes in the background, e.g. flowing water or waving tree leaves.

An overview of prior-art methods for motion segmentation in image sequences obtained by a static camera can be found in "Traditional and recent approaches in background modeling for foreground detection: An overview," by Bouwmans, published in Computer Science Review 11-12, Supplement C, pp. 31-66.

For motion segmentation of a temporal sequence of images acquired by a moving camera, objects that are stationary with respect to the reference environment, e.g. with respect to a terrestrial reference frame, appear at different positions in the sequence of images. Such displacement or shift in the apparent position of an object when viewed along different lines of sight is generally referred to as parallax.

The approaches mentioned hereinabove for motion segmentation in video data acquired by a static camera can, generally, only be applied to obtain reasonable results when the camera moves very slowly with respect to its environment and/or when the camera movement is restricted to a panning and/or tilt movement while its projection center remains fixed. For example, such a pan or tilt motion can be compensated for. However, compensating for the disparity caused by parallax may be substantially harder.

It is known in the art that, for constructing a background model, the parallax due to the camera motion has to be compensated, which, for achieving a reasonable accuracy, typically requires not only information about the motion of the camera, but also about the scene structure. Such information about the scene structure may be inferred from the video frames, but this may come at a prohibitively high computational cost for practical applications. Alternatively, such scene information may be acquired directly by non-trivial fusion of the image information with additional information acquired by other types of sensors, such as by a laser imaging detection and ranging (LIDAR) sensor, which can be expensive and may require complicated data processing.

Even though methods for simplified approximate motion compensation without requiring other sensor information are known in the art, even small inaccuracies in the compensation may quickly degrade the background model, resulting in, for example, extraneous false positive detections.

Prior art methods may relate to foreground/background segmentation with motion compensation, in which an optical flow between subsequent images is analysed to determine an optical flow of the background. However, such approaches may have the disadvantage of the background model being contaminated in complex environments, e.g. in which moving objects occupy a large fraction of the images or when the camera velocity is high relative to the framerate.

Other prior art methods may relate to motion clustering, in which features are tracked over different video frames and clustered into different motion patterns. The dominant pattern may then be assumed to represent a background motion, e.g. due to the camera motion, while minority patterns may be assumed to represent moving objects within the scene.

Yet other prior art methods may relate to geometric constraint-based methods, in which a feature point that does not satisfy the epipolar constraint is assumed to be part of a moving object, whereas feature points that satisfy such epipolar constraint are assumed to belong to the background. However, points that satisfy the epipolar constraint are not necessarily part of the background, even though the inverse implication may be assumed to uphold. For example, an important degenerative case is when a vehicle follows another vehicle, in which case the motion of any feature point on the vehicle ahead will also lie on an epipolar line. To cope with such degenerative cases, additional constraints can be used, at the cost of an increased computational load.

A further prior-art approach relates to the detection of moving objects without relying on motion segmentation. A particular type of objects, such as a pedestrian, a bicycle or a car, is recognized and the movement is then tracked. However, a disadvantage of such approach is that only a limited class of known objects can be detected, as learned by or codified in a suitable algorithm, and it may be difficult to assure a correct detection of an object under diverse conditions, e.g. large datasets may be needed and/or detection may be difficult under conditions non-representative for those used for learning the recognition model, e.g. different lighting conditions, (partial) occlusion by another object and/or partial exclusion of the object from the image frame may degrade the detection performance. Furthermore, tracking a detected object may only become reliable when tracked over several frames when using such an approach.

Further hereinbelow, reference is also made to Yi et al, "detection of moving objects with non-stationary cameras in 5.8 ms: bringing motion detection to your mobile device," in IEEE conference on computer vision and pattern recognition, CVPR workshops 2013, pp. 27-34.

SUMMARY OF THE INVENTION

It is an object of embodiments of the present invention to provide good and efficient means and methods for motion segmentation in a temporal sequence of images obtained by a plurality of moving cameras, e.g. for detecting and/or tracking an object or objects that are moving with respect to a background environment in video data obtained by a plurality of cameras that are also moving relative to that background environment.

It is an advantage of embodiments of the present invention that parallax, in the temporal sequence of images, of objects that remain substantially static in a background environment can be easily compensated, e.g. parallax due to a motion of the cameras acquiring the images.

It is an advantage of embodiments of the present invention that such parallax can be kept at an acceptable level without necessarily requiring a sophisticated model to compensate for the parallax.

It is an advantage of embodiments of the present invention that various prior-art approaches for motion segmentation can be applied to accurately segment motion in video data that is acquired by a plurality of cameras that are moving, including prior-art approaches that are known to be not suitable for segmenting motion in such video data obtained from moving cameras or that are known to offer a poor accuracy in such use case.

It is an advantage of embodiments of the present invention that parallax from motion can be reduced, compensated, controlled at an acceptable level and/or avoided in segmenting motion in image sequences obtained from a plurality of moving cameras.

It is an advantage of embodiments of the present invention that known motion compensation background models can be more robust when applied in combination with a method or a device in accordance with embodiments of the present invention.

It is an advantage of embodiments of the present invention that it can become easier to discriminate between static and dynamic feature points using epipolar or structural constraints in image sequences obtained from a plurality of moving cameras.

It is an advantage of embodiments of the present invention that a simple motion segmentation algorithm can be applied to a complex use case scenario, e.g. a simple motion segmentation method with very limited motion compensation may already be sufficient when applied in combination with a device or method in accordance with embodiments of the present invention to image sequences obtained from a plurality of moving cameras.

It is an advantage of embodiments of the present invention that less computational power and/or cheaper hardware may suffice to attain a comparable quality, or even better quality, in motion segmentation in image sequences obtained by moving cameras than at least some prior-art approaches.

The above objective is accomplished by a method and device according to the present invention.

In a first aspect, the present invention relates to a data processing device for motion segmentation in images obtained by a plurality of cameras that move with respect to a background environment. The data processing device comprises a first input for receiving a temporal sequence of images from the plurality of cameras, and a processor adapted for determining at least one pair of corresponding epipoles for at least two images of said temporal sequence of images that are obtained by at least two different cameras at different points in time. For example, the processor may be adapted for determining at least two pairs of corresponding epipoles for at least three images of the temporal sequence of images. For example, the processor may be adapted for determining at least three, four, eight or more pairs of corresponding epipoles for respectively at least four, five, nine or more images of the temporal sequence of images. The epipoles may lie, but do not have to lie, in the images. An epipole can for instance also define a meaningful region when it lies outside the image boundaries.

The processor is furthermore adapted for defining corresponding image regions of limited image disparity due to parallax around said corresponding epipoles for said at least two images and for warping the corresponding image regions to compensate for a rotation of at least one of said at least two cameras obtaining said at least two images at different points in time and to compensate for a misalignment between said at least two cameras if said rotation and or said misalignment exceeds a threshold value.

The processor is furthermore adapted for applying a motion segmentation algorithm to said corresponding image regions.

In a data processing device in accordance with embodiments of the present invention, the processor may be adapted for, for the at least two images, determining a transformation between the camera positions and/or orientations corresponding to said at least two images, and for determining said corresponding epipoles in said at least two images by taking said transformation into account.

A data processing device in accordance with embodiments of the present invention may comprise a second input for receiving position, speed, velocity and/or acceleration data of a moving reference frame that moves with respect to a world coordinate frame tied to said background environment, and to which moving reference frame said plurality of cameras are tied. The processor may be adapted for determining said transformation taking said data received by said second input into account.

In a data processing device in accordance with embodiments of the present invention, the processor may be adapted for, for a reference image of said temporal sequence of images, determining a plurality of epipoles corresponding to epipoles for at least two other images, of said temporal sequence of images, that are acquired by at least two different cameras at at least one different point in time than the reference image, and for determining, for each of said plurality of epipoles, said image region around said epipole in respectively the reference image and the corresponding other image.

In a data processing device in accordance with embodiments of the present invention, the processor may be adapted for determining said plurality of epipoles by warping the reference image and/or the at least two other images to correct for a lateral movement component of said transformation and for determining said plurality of epipoles taking a longitudinal movement component of said transformation into account.

In a data processing device in accordance with embodiments of the present invention, the processor may be adapted for, for defining each of said corresponding image regions, determining a boundary of each of said image regions, such that each image pixel of the reference image is assigned to the image region of the nearest of said epipoles, or such that each image pixel of the reference image is assigned to the image region of an epipole of said epipoles for the reference image such that the image disparity for that image pixel relative to the other image corresponding to said epipole is the lowest when compared to image disparities for that image pixel relative to the other images corresponding to the other epipoles.

In a data processing device in accordance with embodiments of the present invention, the processor may be adapted for transforming an index map, by applying at least a scaling taking said determined transformation into account, to determine said image regions in said reference image. The transformed index map may define a one-to-one function from said image regions in said reference image to said image regions in said at least two other images. The scaling can be unity. A camera index may be associated with each of the bounded image regions of the reference image and stored in the index map, the camera index signaling the camera which acquired the corresponding image region for the bounded image region of the reference image.

In a data processing device in accordance with embodiments of the present invention, for defining the corresponding image regions, a boundary of each of the image regions may be determined such that an upper bound on the image disparity is below a predetermined threshold in each of said image regions.

In a data processing device in accordance with embodiments of the present invention, the processor may be adapted for stitching together a plurality of image regions defined in the corresponding other images and for applying the motion segmentation algorithm to the reference image and to the stitched image of image regions.

In a data processing device in accordance with embodiments of the present invention, the processor may be adapted for stitching together, into a stitched reference image, a plurality of image regions associated with multiple reference cameras, for stitching together, into a further stitched image, a plurality of image regions corresponding to image regions defined around epipoles of the stitched reference image, and for applying said motion segmentation algorithm to said stitched reference image and to said further stitched image In a data processing device in accordance with embodiments of the present invention, the processor may be adapted for separately applying the motion segmentation algorithm to each image region in the reference image and the corresponding image region in another image.

In a data processing device in accordance with embodiments of the present invention, the processor may be adapted for applying an algorithm for compensating for a random motion to the images and/or to the corresponding image regions.

In a second aspect, the present invention relates to a system for motion segmentation in images obtained by a plurality of cameras that are movable, in operation, with respect to a background environment. The system comprises a data processing device in accordance with embodiments of the first aspect of the present invention and the plurality of cameras operably connected to the first input for capturing said temporal sequence of images and providing said temporal sequence of images to said data processing device.

A system in accordance with embodiments of the present invention may comprise a position, speed, velocity and/or acceleration sensor for providing a position, a speed, a velocity and/or an acceleration of the system with respect to the background environment to the data processing device.

A system in accordance with embodiments of the present invention may be a vehicle.

In a third aspect, the present invention relates to a computer-implemented method for motion segmentation in images obtained by a plurality of cameras that are moving with respect to a background environment. The method comprises capturing a temporal sequence of images using said plurality of cameras, and, for at least two images, of the temporal sequence of images, that are obtained by at least two different cameras at different points in time, determining a pair of corresponding epipoles. The method comprises defining corresponding image regions of limited image disparity due to parallax around said pair of corresponding epipoles in said at least two images, and applying a motion segmentation algorithm to said corresponding image regions. According to one step of the method, the corresponding image regions are warped to compensate for a rotation of at least one of said at least two cameras obtaining said at least two images at different points in time and to compensate for a misalignment between said at least two cameras if said rotation or said misalignment exceeds a threshold value.

The method may comprise the additional steps of selecting camera pairs from said plurality of cameras in accordance to an index map, and defining corresponding image regions of limited image disparity due to parallax around at least one pair of corresponding epipoles for images obtained by each of the selected camera pairs.

Particular and preferred aspects of the invention are set out in the accompanying independent and dependent claims.

These and other aspects of the invention will be apparent from and elucidated with reference to the embodiment(s) described hereinafter.

Figure 1:
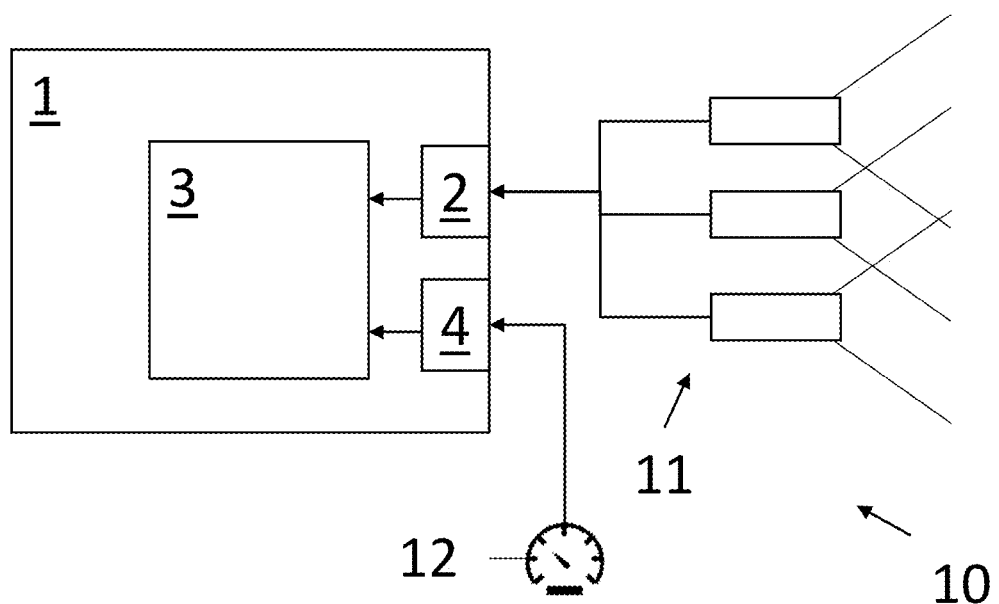
FIG. 1 illustrates a device and a system in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention disclosure the terms (camera) image and snapshot will be used interchangeably.

In the context of the present invention disclosure the terms image and image plane are often used interchangeably, unless indicated otherwise. The bounded image acquired by a camera is in direct correspondence with the unbounded image plane located in front of that camera. In consequence, intersections, lines, and epipolar points expressed in a coordinate system for the image plane have their corresponding intersections, lines, and epipolar points expressed in a coordinate system for the image, wherein the latter coordinate system is often using normalized camera coordinates or pixel coordinates (e.g. in digital cameras). The coordinate systems for the image plane and the image are linked by a coordinate transformation which accounts for the camera's imaging properties, including image distortion, image magnification, and the like.

In the context of the present invention, a "reference image" refers to an image acquired by a single camera at a single moment in time or to a virtual image obtained by merging, overlapping or stitching together multiple images acquired by two or more cameras at same or different moments in time, subject to applying an adequate rectification to the acquired images. Rectifications to images are computable as planar homographies (estimated or derived from sensor/camera relative position data) acting on the image plane associated with the image that is rectified.

In the context of the present invention, a "reference camera" designates the camera which has been selected for the acquisition of the reference image. There is in general no specific camera of the plurality of cameras designated as reference camera and a change of designation is accompanied with a change of the acquired reference image. If the reference image refers to a virtual image obtained from two or more cameras then the two or more cameras are all designated as reference cameras.

In a first aspect, the present invention relates to a data processing device for motion segmentation in images, i.e. in a temporal sequence of images, obtained by a plurality of cameras that move with respect to a background environment defining a world coordinate reference frame, e.g. for detecting and/or tracking an object or objects that are moving with respect to a background environment in video data obtained by a plurality of cameras that are also moving relative to that background environment.

The data processing device comprises a first input for receiving a temporal sequence of images from the plurality of cameras and a processor. The processor is adapted for determining at least one pair of corresponding epipoles, i.e. epipole points, for at least two images of the temporal sequence of images that are obtained at different points in time. For example, the at least one pair of corresponding epipoles may be determined by calculating a position of the corresponding epipoles for at least one of the at least two images. For example, a n-tuple of corresponding epipoles (n>1) may be determined for n images of the temporal sequence of images, e.g. by calculating the position of the corresponding epipoles for at least one of the n images, e.g. for each of the n images. For example, for a first reference image and n−1 further images, n−1 different pairs of epipoles may be determined, e.g. for the combination of the reference image with each of the n−1 further images that are obtained at a different time index than the reference image.

In embodiments of the invention, the determined epipolar points for corresponding images are typically located within the image. However, embodiments of the invention are not limited to corresponding epipoles that lie within the acquired images. For instance, epipoles may be located on the image planes such that their images lie outside the image bounds when acquired by the cameras. Nevertheless, their influence on the image disparity in image regions around them is of such nature that a reduced image disparity may still be detected at a satisfactory level at the image edges even if the images epipole lies outside the acquired image. Furthermore, it is possible, geometrically at least, to detect corresponding epipolar points that lie at infinity, e.g. for two coplanar cameras, and a disparity between two images acquired by two coplanar cameras may still be small provided that the two cameras are spaced closely to one another.

For example, the first reference image $C_0(t)$ may be obtained by a reference camera at a time index t, and the further images may be obtained at another time index, e.g. t+1. For an array of n cameras, the reference image $C_0(t)$ may be combined with n images $C_0(t+1)$, $C_1(t+1)$, ..., $C_n(t+1)$ to form n pairs ($C_0(t)$, $C_0(t+1)$), ($C_0(t)$, $C_1(t+1)$), ..., ($C_0(t)$, $C_n(t+1)$), where for each pair the corresponding epipole points may be determined in respectively the first image (the reference image) and the second image. However, embodiments of the present invention are not limited to the use of a single reference image. For example, for an array of n cameras, each camera may (at least potentially) be used to obtain a reference image, e.g. at a time index t, and the pair of corresponding epipoles may be determined for that image in combination with another image obtained from the same or another camera of the array at another time index, e.g. t+1. Thus, for an array of n cameras, binomial(n,2)=n(n−1)/2 different image pairs may be used to determine corresponding epipole points for that pair. Furthermore, embodiments are not necessarily limited to pairs of images that differ by a single time step, e.g. also $C_i(t), C_j(t+k)$ pairs may be considered where k is an integer greater than 1, thus extending the number of potential image pairs (relative to a single time reference point t) even further.

The processor is adapted for defining corresponding image regions of limited image disparity due to parallax, e.g. in which the image disparity is below a predetermined threshold, around the corresponding epipoles for the at least two images, and for applying a motion segmentation algorithm to the corresponding image regions.

For example, the pair of corresponding epipoles may be determined explicitly, and for each epipole, corresponding image regions may be defined in the at least two images to limit the disparity between these corresponding image regions, e.g. below a predetermined threshold. However, the pair of corresponding epipoles may also be determined implicitly by directly determining the regions around such corresponding epipoles where the limited disparity is achieved, e.g. such that the position of the pair of corresponding epipoles is implicitly determined (e.g. approximately) as lying within the corresponding regions.

Particularly, the processor may be adapted for determining a plurality of pairs of such corresponding image regions, e.g. each comprising a region in a first reference image taken at a first instant in time and a region in another image (e.g. a different image for each of the plurality of pairs) taken at another instant in time, such that for each pair of corresponding regions a limited image disparity is achieved between that pair of corresponding regions.

In a second aspect, the present invention also relates to a system for motion segmentation in images obtained by a plurality of cameras that are movable with respect to a background environment. The system comprises a data processing device in accordance with embodiments of the first aspect of the present invention and the plurality of cameras operably connected to the first input for capturing the temporal sequence of images and providing the temporal sequence of images to the data processing device.

Referring to FIG. 1, a data processing device 1 in accordance with embodiments of the present invention is schematically illustrated. The data processing device is adapted for motion segmentation in images obtained by a plurality of cameras that move with respect to a background environment defining a world coordinate reference frame.

The data processing device 1 comprising a first input 2 for receiving a temporal sequence of images from the plurality of cameras. The temporal sequence may comprise at least two images obtained from a first camera at at least two different points in time and at least two images obtained from a second camera at at least two different points in time, e.g. preferably at substantially the same points in time as the at least two images obtained from the first camera. However, embodiments of the present invention are not necessarily limited thereto. For example, the temporal sequence may comprise at least two images, which are obtained at at least two different points in time and from at least two different camera positions.

FIG. 1 also illustrates a system 10 for motion segmentation in images obtained by a plurality of cameras in accordance with embodiments of the present invention that are movable with respect to a background environment. The system comprising the data processing device 1 in accordance with embodiments of the first aspect of the present invention and the plurality of cameras 11 operably connected to the first input 2 for capturing the temporal sequence of images and providing the temporal sequence of images to the data processing device 1 via the first input 2. The system 10 may be a vehicle, such as a ground vehicle, an aircraft or a water vehicle. The vehicle may be a wheeled vehicle. The wheeled vehicle may be an automobile, an autobus, a lorry, a motorcycle or a similar means of transportation.

It is to be noted that the plurality of cameras 11 does not necessarily correspond to a plurality of separate and distinct camera systems. For example, a single image detector can be used, e.g. in combination with a translation scanning mechanism and/or a plurality of optical elements, e.g. microlenses, to obtain images corresponding to a plurality of projection centers, e.g. a plurality of distinct principal or nodal points.

The plurality of cameras 11 may form an array of cameras, such as a linear array of cameras, e.g. a horizontal or a vertical arrangement of cameras, a cross-shaped array, e.g. a combination of a horizontal and a vertical array of cameras, a two-dimensional array of cameras, e.g. arranged in a cartesian or polar grid, or, in general, any three-dimensional arrangement of cameras.

Thus, the cameras may be mounted along a line, in a plane, in a spherical configuration, or any other geometric arrangement. For each pair of cameras there will be a common line of sight which gives rise to a region of low disparity in the image planes, to be used in accordance with embodiments of the present invention.

Figure 2:
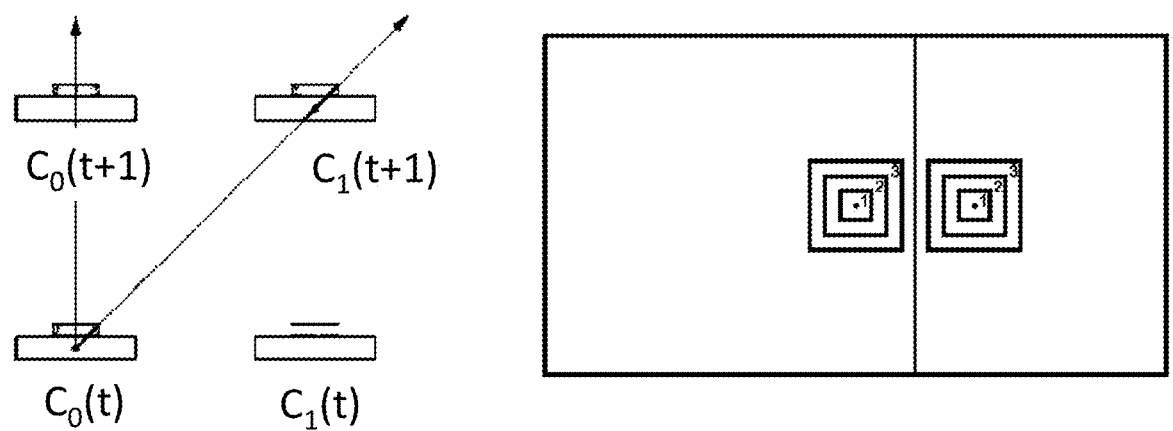
FIG. 2 illustrates a two-camera system which capture an image at two points in time and in which the positions of the cameras are translated between these time points, for illustrating embodiments of the present invention.

Two modi operandi may be considered for a non-linear and non-planar configuration:
  All cameras take snapshots at the same times, i.e., t,t+1, . . . . Then in general there will be no collinear triples or any larger collinear subsets. Hence, the approach as described further hereinbelow may be restricted to camera pairs.
  Some cameras may be slightly delayed until they are at the right position to take a snapshot. In this way the same geometric relationships can be obtained as for a linear or planar array, e.g. as illustrated in FIG. 2.

Thus, on a vehicle, no essential limitation may exist on where the cameras are placed. For example, cameras may be placed near the rear view mirror and yet still be operably combined in a system in accordance with embodiments of the present invention with cameras placed near the head lights.

The cameras may be substantially fixed in position with respect to each other but may move (or at least can move) collectively through the background environment, e.g. by being fixedly mounted on a vehicle.

The number and specification, e.g. in terms of resolution and/or framerate, of the cameras may vary across embodiments of the present invention. For example, more cameras and/or a higher framerate may advantageously further reduce parallax.

The cameras are generally arranged in such a way that each camera has at least an overlapping view cone with another camera of the plurality of cameras. The mutually overlapping view cones of a plurality of cameras may be obtained dynamically, e.g. by rotating and/or translating one or more cameras with respect to each other, and may be limited in time to sufficiently long time intervals during which images by the respective cameras are acquired as part of the temporal sequence of images.

The optimal camera spacing within an array of identical cameras may depend on multiple parameters, and on the application. If the application requires that for the whole camera array comprising the plurality of cameras a horizontal field of view is covered of at least θ radians, the following conditions can be applied:
  the camera's (actual) focal length $f_{mm}$ and the physical sensor width w may satisfy the inequality $\tan(\theta/2) \leq w/(2f_{mm})$, the maximum expected velocity v of the movement with respect to the background environment, the inter-frame interval $\Delta_t$ and the lateral distance between the leftmost and rightmost camera $|X_{right}-X_{left}|$ may satisfy the inequality $\tan(\theta/2) \leq (|X_{light}-X_{left}|)/(v\Delta_t)+\epsilon$ in which $\epsilon$ is a small margin than may be calculated from the disparity limit.

For the vertical field of view, the inequalities are very similar. The second relationship may determine the framerate of the cameras, which may be chosen to be high enough to accommodate the required field of view up to the maximum speed expected in this application. A high fixed framerate, however, may have the disadvantage that at lower speeds the points of zero disparity afforded by N consecutive snapshots are spaced further apart, and many theoretical points of zero disparity may fall outside the field of view of any camera. In practice, either N may be varied with the velocity of the vehicle, or the cameras may have a variable framerate (e.g. triggered by a distance interval instead of a time interval).

Apart from the camera array field of view, e.g. as determined by the span of the camera array as limiting condition, the number of cameras may also be important. Given a maximum allowed disparity for objects at a depth distance/z-distance, d, from a reference camera $C_0$, the number of cameras may be evaluated. Considering two adjacent cameras $C_1, C_2$ in the array, it can be seen that relative to the reference camera $C_0$, a maximum horizontal disparity may occur for points that are situated on the viewing direction that bisects the line segment between $C_1$ and $C_2$. Referring to the examples provided further hereinbelow, it can be shown that for a point, to have equal disparity in $C_1$ and $C_2$, (with coordinates $(X_{S1},Y_S,Z_S)$ and $(X_{S2},Y_S,Z_S)$ respectively) the following relation may apply: $X_0 Z_S/d=(X_{S1}+X_{S2})/2$.

The maximum horizontal disparity for points that satisfy this relation is given by $$\Delta_{max} = \frac{f}{d-Z_S} \frac{|X_{S2}-X_{S1}|}{2},$$

where f refers to the focal length of the cameras.

In order to achieve a certain limit on this maximum disparity, a trade-off can be made between two elements in this equation: the horizontal camera array spacing $X_{S2}-X_{S1}$ and the longitudinal distance available to the reference camera $Z_S$, i.e. the distance driven between the earlier moment in time of capturing an oldest snapshot in the framebuffer and the later moment in time of capturing a most recent snapshot. Hereinafter, the term "framebuffer" refers to a collection of multiple stored images, e.g. multiple queued images stored in a memory unit of each camera, said collection of stored images being obtained by a corresponding collection of image acquisitions by the camera(s) spanning at least two different time instances. While the framebuffer can be taken arbitrarily long to achieve any disparity limit with only two cameras (e.g. whose spacing is chosen to satisfy the field of view requirement as explained above), in practice the elapsed time between the oldest and newest image in the buffer must be short enough to allow a good foreground-background segmentation. Hence the driven distance between the oldest and newest image in the buffer is determined by the segmentation algorithm's time limit. A strategy for determining a camera spacing could thus be as follows:

determine the horizontal array width based on field of view requirement, determine the maximum acceptable time delay between the first and last image in the buffer based on foreground-background algorithm, determine the maximum horizontal gap in the camera array based on this maximum time delay and the maximum velocity requirement.

Embodiments of the present invention are not necessarily limited to a collective movement of a plurality of cameras that are arranged in a fixed configuration with respect to each other. For example, each of the plurality of cameras may move (or can move) independently through the background environment, or the plurality of cameras may move (or can move) collectively through the background environment in addition to a predetermined movement of each camera with respect to the other cameras, e.g. such as to follow a predetermined scanning pattern in a joint frame of reference that moves (or can move) with respect to the background environment. For example, the processor 3 may be adapted for combining information about a collective movement of the system in the background environment, e.g. with respect to a terrestrial reference frame, and a specific movement of each (or at least one) of the cameras with respect to a moving reference frame of the system 10.

Although some calibration of the cameras may be predetermined, e.g. in terms of relative positions, orientations and/or focal length, such camera calibration may be advantageously less critical than a calibration required by a multi-camera system for motion segmentation using moving images as known in the art, e.g. using stereo pair imaging.

The plurality of cameras 11 acquires a plurality of images at a plurality of points in time, e.g. such as to obtain a temporal sequence of image frames. For example, at each point in time, each of the cameras may collect/acquire an image.

The plurality of cameras 11 may be fixed with respect to a reference frame that moves in the background environment, such as a reference frame tied to a moving vehicle (or, generally, a vehicle that can move while the device is operational).

For example, the plurality of cameras 11 may comprise at least two cameras. FIG. 2 illustrates a two-camera system comprising cameras $C_0$ and $C_1$, which capture an image at respectively a time t and t+1, and in which the positions of the cameras are translated between these time points.

The data processing device comprises a processor 3. For example, the processor may comprise a general-purpose computer, a controller, an application-specific integrated circuit (ASIC), and/or a field-programmable gate array (FPGA). The processor may comprise a central processing unit, a digital data storage memory and/or a program code storage memory, such as a read-only memory, a flash memory or a persistent random-access memory. The central processing unit may have a conventional central processing unit architecture, e.g. having one or a few, e.g. two, three, four, six, eight or sixteen, processing cores, but may also comprise, or may alternatively be substituted with, a processing unit having a highly parallel processing architecture, such as a graphics processing unit (GPU), a stream processing and/or general purpose graphics processing unit (GPGPU) and/or a cell broadband engine architecture microprocessor. The processor may comprise computer code interpretable by the processor for performing the functions as described hereinbelow.

The processor 3 may be adapted for performing a correction for lens distortion. For example, because of lens distortion, a point in a scene will not always be mapped onto the same pixel by different lenses. To avoid unnecessary disparity from lens distortions, the effect of lens distortion may be corrected before performing the processing described further hereinbelow. Such lens distortion correction algorithms are well-known in the art, e.g. it is known in stereo and multi-view camera systems to correct each acquired image by applying a geometric transformation.

The processor 3 may be adapted for, for at least two images of the temporal sequence of images, that are obtained at different points in time, determining a transformation between the camera positions and/or orientations corresponding to the at least two images. The transformation may comprise, at least, determining a shift vector along a longitudinal direction between different points in time, in which the longitudinal direction is aligned with a principal direction of movement of the cameras. Furthermore, the longitudinal direction may also be substantially aligned with a viewing direction of at least one of the cameras, e.g. all cameras may be aligned with the longitudinal direction, although embodiments of the present invention are not limited thereto. The transformation may also comprise one or two components perpendicular to the longitudinal direction and/or a rotation component, e.g. corresponding to a tilt and/or yaw angle.

The data processing device 1 may comprise a second input 4 for receiving position, speed, velocity and/or acceleration data of a moving reference frame that moves with respect to the world coordinate frame and to which moving reference frame the plurality of cameras are tied. The moving reference frame may, for example, correspond to a reference frame tied to a moving vehicle comprising the cameras. Thus, the second input 4 may be adapted for receiving movement data indicative of a movement of the plurality of moving cameras with respect to the background environment.

The second input may be adapted for receiving data from, or may comprise, an odometry system. The second input may be adapted for receiving data from, or may comprise, a positioning system, e.g. a terrestrial positioning system, e.g. a global positioning system (GPS). The second input may be adapted for receiving data from, or may comprise, an accelerometer.

Thus, the second input 4 may comprise an odometer, an accelerometer or a position sensor for determining the movement data by measuring a physical quantity or receiving positional beacon information.

The second input 4 may be adapted for receiving the movement data from such an external sensor or receiver.

The system 10 may comprise a position, speed, velocity and/or acceleration sensor 12 for providing a position, a speed, a velocity and/or an acceleration of the system 10 with respect to the background environment, e.g. via the second input 4, to the device 1.

For example, the second input 4 may receive external odometry data, e.g. a wheel speed of a vehicle on which the cameras are mounted. For example, such second input may be received from an on-board diagnostics system (OBDII) or a vehicle communication bus (such as a CAN bus) of a vehicle. Alternatively or additionally, the second input 4 may receive data from an accelerometer or positioning sensor, e.g. a GPS receiver.

The processor may be adapted for determining the transformation by taking the data received from the second input into account. As is well known in the art, relative positional information and/or relative orientation information may be determined by direct measurement, integration of velocity data and/or double integration of acceleration data, and/or a combination thereof.

Additionally or alternatively, the processor may be adapted for determining (or improving the accuracy of) the transformation by applying a motion detection algorithm, e.g. an optical flow algorithm, to the at least two images. For example, while one way to obtain positional information, speed, velocity and/or acceleration directly, e.g. using an external odometry input, such as a wheel speed from an on-board diagnostics system (OBDII) or a vehicle CAN-bus, the relative positions and/or orientations can also be determined from the images themselves, using an algorithm known in the art, such as an optical flow analysis. This may come at the cost of additional processing, but may simplify and/or reduce the cost of the hardware.

For example, odometry may be derived from the images using a "visual SLAM" method as known in the art. For example, the KITTI Vision Benchmark Suite may comprise suitable algorithms for odometry from images.

The processor 3 may be adapted for determining the transformation between the camera positions and/or orientations corresponding to the at least two images in the world coordinates, in a coordinate system of one of the at least two images, or in another coordinate system. Advantageously, the transformation may be determined in the coordinate system tied to one of the at least two images, e.g. a reference image, to simplify the computation.

The processor 3 is adapted for determining at least one pair of corresponding epipoles for the at least two images, e.g. by taking the determined transformation into account. For each pair of the at least two images, an epipole for the first image of the pair and a corresponding epipole for the second image of the pair may be determined by numerically determining an intersection point of a line of world coordinates through the positions of the optical center associated with each of the images in that pair and the image plane of respectively the first image and the second image of that pair. However, the pair of corresponding epipoles may be implicitly determined in the second image once the position of the epipole for the first image has been determined. Furthermore, the position of the epipole is not necessarily determined geometrically, e.g. to within a single pixel accuracy for above intersections, but may also be determined by comparing images in the temporal image sequence as discussed further hereinbelow, e.g. by directly determining (e.g. via adequate image processing algorithms such as, but not being limited to, optical flow) the corresponding regions of low or zero image disparity for an image pair acquired by two distinct cameras at two different times, for which the corresponding epipoles are determined.

Such numerical determination of the epipoles may take differences in a longitudinal position, e.g. along the optical axes, into account, may take differences in a two-dimensional position into account, e.g. along both the longitudinal position and a lateral position perpendicular to the longitudinal position and together with the longitudinal direction in a principal plane of movement of the camera in world coordinates, and/or may take differences in a three-dimensional position into account. Furthermore, such numerical determination may take differences in orientation, e.g. in a yaw, roll and/or tilt direction, of the image acquisitions into account. Furthermore, such numerical determination may take differences in focal length of the image acquisitions into account. The examples provided further hereinbelow provide exemplary equations for determining the epipoles that may be used by the processor in accordance with embodiments of the present invention, embodiments of the present invention not necessarily limited thereto.

For example, the cameras may move predominantly along the longitudinal direction, e.g. when mounted on a vehicle that predominantly drives straight ahead. For simplifying the applied calculations, when the cameras collectively turn in their background environment, e.g. when the vehicle takes a turn, the parallax will still be zero at one point in the image plane associated with the reference camera or at one point in a virtual image plane of reference associated with the whole of the camera array. However, due to a significant rotation of the vehicle, one of the images must be warped before motion segmentation can be applied. Image warping for motion segmentation is well-known in the art, e.g. as described in Yi et al, "detection of moving objects with non-stationary cameras in 5.8 ms: bringing motion detection to your mobile device," in IEEE conference on computer vision and pattern recognition, CVPR workshops 2013, pp. 27-34. Thus, after applying such warping (a special class of planar homographies) to correct for a rotation, determining the epipoles may advantageously be reduced to taking a longitudinal movement into account.

For example, while in embodiments of the present invention the image planes of all cameras may be parallel to each other, embodiments of the present invention are not necessarily limited thereto. For example, at least one of the cameras may not be mounted in perfect alignment, such that small deviations in the principal axis of the cameras, will give rise to non-parallel image planes. Furthermore, the movement of the cameras may deviate from the longitudinal axis. For example, a vehicle on which the cameras are mounted may not always drive straight ahead, e.g. the vehicle may take a turn. Although the image planes of the cameras that take a snapshot at a time t may be parallel to each other, they may therefore be not parallel to the image planes of the snapshots taken at t+1,t+2, . . . during such motion that deviates from the longitudinal axis. In both cases there will still be points in the reference image where the disparity due to parallax is zero, and these points will still coincide with the epipoles of the pairs. However, to reduce the disparity in a region surrounding the epipoles, an additional rectification step may be performed when the deviation from the longitudinal axis for at least one of the cameras is too large, e.g. above a predetermined threshold. The rectification may consist of a geometric transformation of the images, which may be based on a set of parameters that can be derived from an extrinsic calibration of the cameras.

The rectification may depend on what caused the anomaly:

For non-perfectly mounted cameras, there may be a predetermined rectification that brings the image planes of the array in line, e.g. returning the principal axes of the cameras to being parallel to the longitudinal direction. The parameters for such rectification can be derived from an initial calibration or recalibration of the cameras.

When the cameras are jointly turning from the longitudinal axis, the rectification parameters may be computed from the transformation previously determined by the processor, e.g. from odometry of a vehicle on which the cameras are mounted. For example, the rectification parameters may change while the vehicle turns. If, in addition, the cameras are not perfectly mounted, this second rectification can be combined with, e.g. added to, the first rectification.

The processor may also be adapted for determining the epipoles without taking the transformation explicitly into account. For example, the epipoles, and thus the position of the regions of low parallax, can be directly derived from the images, without computing the relative positions of the cameras where the images were acquired, although this may require some additional processing. For example, the epipoles can be determined by finding the positions where the parallax is zero with optical flow analysis. Points close to the epipoles coincide with small optical flow vectors determined from an image pair.

Estimating the position of the epipoles can also be done with methods known in the art. An exemplary approach is to first find the correspondences between a set of automatically selected feature points (e.g. using a feature detection algorithm such as SIFT or SURF) in both images of a pair. From these correspondences, a fundamental matrix (e.g. as described in Hartley, "in defense of the eight-point algorithm," IEEE transactions on pattern analysis and machine intelligence, vol. 19, pp. 580-593) and the corresponding epipolar lines and epipoles may be determined.

The processor 3 is adapted for defining corresponding image regions of limited image disparity due to parallax around the pair (or n-tuple of pairs) of corresponding epipoles in the at least two images.

The processor 3 may be adapted for, for a reference image of the temporal sequence of images, determining a plurality of epipoles corresponding to epipoles in at least two other images, of the temporal sequence of images. The at least two other images may be acquired at at least one different point in time than the reference image, but not necessarily limited to one different point in time. The processor may be adapted for defining, for each of the plurality of epipoles, the corresponding image regions around the epipole in respectively the reference image and the corresponding other image.

The processor 3 may be adapted for defining the corresponding image regions by determining a boundary of each of the image regions such that each image pixel of the reference image is assigned to the image region of the nearest of the epipoles.

The processor 3 may be adapted for defining the corresponding image regions by determining a boundary of each of the image regions such that each image pixel of the reference image is assigned to the image region of the epipole such that a maximally bounded image disparity for that image pixel relative to the other image corresponding to that epipole is lowest, i.e. smallest, when compared to the maximally bounded image disparity for that image pixel relative to the other images corresponding to the other epipoles.

For example, for each point in the scene, a pair of cameras may be selected for which the disparity is minimal. The selection of this pair advantageously does not substantially depend on the distance between the cameras and the object. By combining different camera pairs, different sub-regions in a reference image can be obtained in which the parallax remains small. Furthermore, a simple method can be used to automatically choose the image regions across time and across cameras that yield a good, e.g. a minimum, disparity.

The processor 3 may be adapted for defining the corresponding image regions by determining a boundary of each of the image regions such that an upper bound on the image disparity, i.e. a maximally bounded image disparity, is below or equal to a predetermined threshold. For example, when correcting for a longitudinal movement component, e.g. after having applied a warping to compensate for lateral and/or rotational components, a predetermined threshold $|\Delta_{x,th}|$, $|\Delta_{y,th}|$ may be applied to the disparity, and the area of the image region characterized by the limited disparity may be defined by applying the thresholds, e.g. imposing $|\Delta x| \leq |\Delta_{x,th}|$, $|\Delta_y| \leq |\Delta_{y,th}|$, in the following equation, which assumes that the respective cameras of a selected camera pair are not coplanar:

$$(\Delta_x, \Delta_y)^T = \frac{Z_S}{Z - Z_S}(x - e_x^S, y - e_y^S)^T$$

where $Z_S$ refers to the longitudinal world coordinate of the camera projection centre, e.g. a longitudinal distance between the camera centres for the images in which the corresponding epipoles are considered, Z refers to the longitudinal world coordinate of a world point p, (x,y) refer to coordinates in the image plane onto which the world point p projects, and $(e_x^S, e_y^S)$ refer to the image plane coordinates of the epipole. Thus, the region where the image coordinates x and y are within respectively the range of $$e_x^S - \frac{Z - Z_S}{Z_S}\Delta_{x,th}$$

to $$e_x^S + \frac{Z - Z_S}{Z_S}\Delta_{x,th}$$

and the range of $$e_y^S - \frac{Z - Z_S}{Z_S}\Delta_{y,th}$$

to $$e_y^S + \frac{Z - Z_S}{Z_S}\Delta_{y,th}$$

may correspond to the region of limited image disparity.

Z may advantageously be replaced by a lower bound on the distance for which the disparity is to be controlled within the predetermined thresholds, e.g. a predetermined minimal distance for background objects. It can also be noted that the denominator $Z-Z_S$ can be advantageously simplified to Z, assuming that $Z>>Z_S$. It can easily be seen that for any point at a larger distance than this distance Z, the disparity will be smaller, and hence would also be below the imposed threshold for a point at the distance Z.

For example, identifying the corresponding image regions may comprise, for a first image pixel location or a first image region in a first image, e.g. a reference image, obtained at a first point in time, of the temporal sequence of image data, evaluating a plurality of images obtained for at least one different point in time, e.g. obtained at the different point or points in time by the same and/or different cameras, and selecting a second image pixel location or a second image region in one of the evaluated images for which the disparity relative to the first image is below a predetermined threshold or is minimal over the evaluated images. For example, a comparison of many combinations of image regions may be performed. However, the required processing power may still remain advantageously low, e.g. because each combination may only involve a comparison of small image regions. Nevertheless, as will be explained further hereinbelow, this selection may be efficiently carried out using a reference map, e.g. a lookup reference image or a tessellation of a reference image in an analytical form, e.g. a description of a plurality of boundaries between image regions, e.g. an index map.

For example, the processor may be adapted for using a discrete two-dimensional reference map, such that the most appropriate camera pair can be determined for each pixel by a simple scaling transformation and look-up operation.

Figures 13, 14:
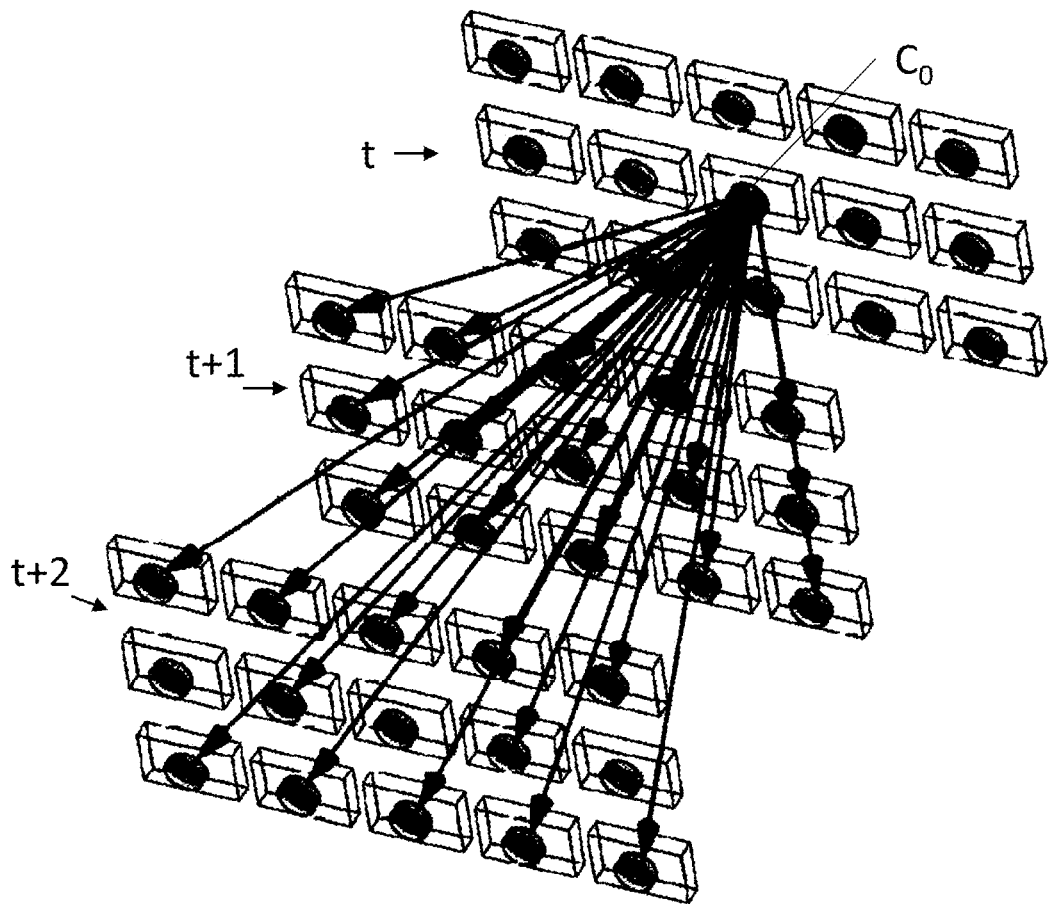
FIG. 13 shows a 5-by-3 array of cameras, at three different positions in time, for illustrating embodiments of the present invention.
FIG. 14 shows, in the image of a reference camera, at which points the disparity is zero for a corresponding other camera, for illustrating embodiments of the present invention.

For example, when the cameras are arranged in a linear array, parallax can be controlled below a predetermined threshold, e.g. for a minimum distance of objects considered, along the direction in which this array is arranged. For example, the cameras may be arranged horizontally, to compensate for parallax in the horizontal viewing direction. This can be extended to a two-dimensional array of cameras, in which low parallax can be assured in a horizontal strip around the horizon but also below and above the horizon. For example, FIG. 13 depicts a 5-by-3 array of cameras. FIG. 14 shows, in the image of the reference camera $C_0$, at which points the disparity is zero for a corresponding other camera. Since the reference camera at a time t, $C_0(t)$, can be combined with 15 cameras at t+1, and 15 cameras at t+2, up to 30 points in the image can be defined where the disparity is zero. However, because there are 3 collinear camera triples in the configuration, some of the points in FIG. 14 coincide, which reduces the number of distinct points to 27.

FIG. 14 also illustrates vertical and horizontal lines that can be used to divide a reference image into different regions, e.g. a tessellation. For each region there is one camera pair which yields minimal disparity within the region. However, since the disparities $\Delta_x$ and $\Delta_y$ are independent from each other, the camera pair that gives to minimal disparity for the x-component, may be not be the same as the camera pair that provides minimal disparity for the y-component. In fact, this will happen in each of the regions in FIG. 14 that do not contain a point where the disparity is zero. For example, for this kind of region one can select one of the camera pairs from the neighboring regions.

On vehicles it can make sense to use an array of cameras that are tilted slightly downwards so that they cover a larger part of the road. Tilting the cameras will not change the working principle of the present invention. However, the points where disparity becomes zero will no longer lie on the horizontal line through the center of the image, e.g. as shown in FIG. 14, but may be shifted slightly upwards in the image.

The processor may also be adapted for transforming a reference map, e.g. a lookup or index map, to determine regions in a reference image. For example, the reference map may define regions in the reference image, after a suitable transformation of the reference map, such that each region refers to a different image taken at a different instant in time than the reference image, e.g. in which the different image is acquired by the same or another camera than the reference image. The pixels in each region may be subject to a minimal disparity in relation to the different image that is referenced by that region, e.g. when compared to the images referenced by the other regions. Transforming the reference map may comprise applying a scaling transformation, in which the scaling transformation takes a travelled distance and/or velocity in the longitudinal direction, e.g. a principal direction of movement, into account, e.g. corresponding to (or derived from) the transformation determined by the processor as described hereinabove. Furthermore, as was already described hereinabove, the images may be transformed, e.g. before using the regional correspondences defined by the transformed reference map, to take a tilt and/or yaw rotation with respect to the longitudinal direction into account.

The computations performed by the processor are not necessarily limited to solely operations on camera pairs. For example, for a given camera arrangement, any subset of collinear cameras may determine a region, e.g. an image sub-region, of low parallax that can be used for motion segmentation. Larger subsets may provide more information for a background model.

For example, the processor 3 is adapted for identifying two corresponding image regions of images in the temporal sequence of image data that correspond to different points in time and that are obtained by different cameras of the plurality of cameras. This does not exclude the case of the processor 3 being adapted for identifying two corresponding image regions of images in the temporal sequence of image data that correspond to different points in time and that are obtained by the same camera. The corresponding image regions may be selected such that a disparity due to parallax between the two image regions is low, e.g. below a predetermined disparity threshold. For example, the two image regions may be selected such that the disparity due to parallax is minimal.

For the sake of simplicity, one of the cameras may be selected as a reference camera. Thus, regions in a reference image may be defined and corresponding regions in other images, at different instants in time, such that a low disparity between the regions in the reference image and the corresponding regions in the other images can enable a reliable, efficient and/or simple motion segmentation. However, a drawback of such selection of a single camera image as a reference image may be that this could result in an asymmetrical distribution of the regions of low disparity due to parallax on the image plane, as illustrated on the right hand side of FIG. 2.

If a more symmetric distribution of the image regions is desirable, an alternative may be to consider the regions of low disparity on a virtual image for a plane located in front of the center of projection for at least one camera of the arrayed camera configuration, e.g. to evaluate each image with respect to a virtual image in a plane in front of the center of projection for the at least one camera. This virtual image is then selected as the new reference image.

Figure 18:
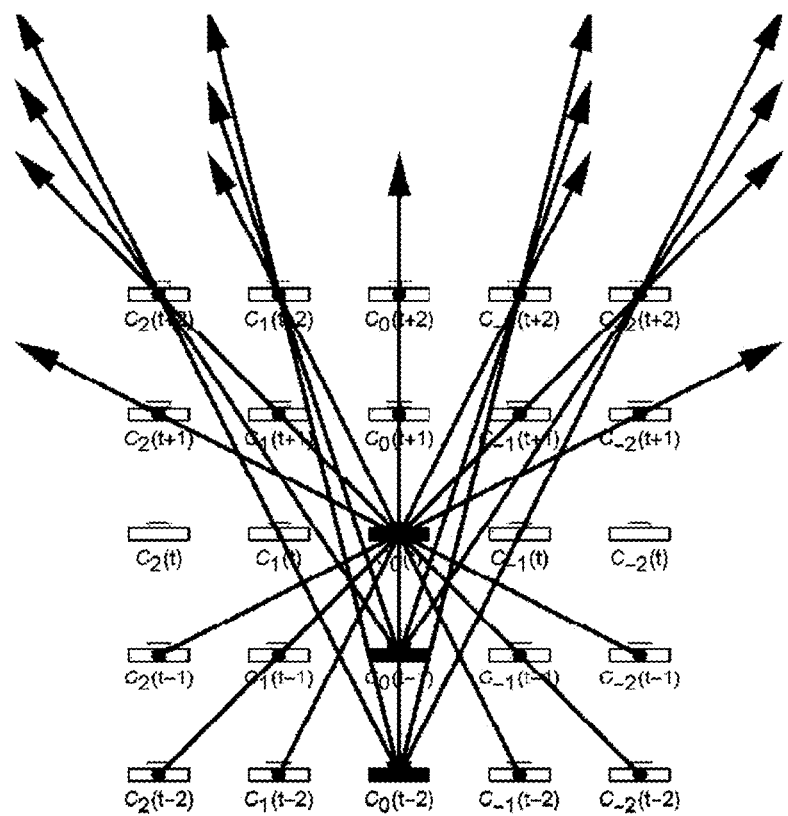
FIG. 18 illustrates combinations of multiple pairs of images, e.g. pairs not comprising solely a single common reference image, for illustrating embodiments of the present invention.

Furthermore, instead of using a reference image captured by a single reference camera at time t, $C_0(t)$, multiple pairs of images, e.g. all usable pairs in the array, e.g. pairs not comprising solely a single common image as reference, may be used. FIG. 18 illustrates this concept. To create common lines of sight over a wider range of viewing angles, three distinct camera positions are used, in this example, namely $C_0(t)$, $C_0(t-1)$ and $C_0(t-2)$. Thus, additional directions along which the disparity will be low can be obtained, which cannot be realized by a single-camera reference image. For example, camera $C_0(t-1)$ may add four new directions when combined with $C_2(t+1)$, $C_1(t+1)$, $C_{-1}(t+1)$ and $C_{-2}(t+1)$. Likewise, four additional directions are obtained when $C_0(t-1)$ is added as a third reference camera.

Figure 19:
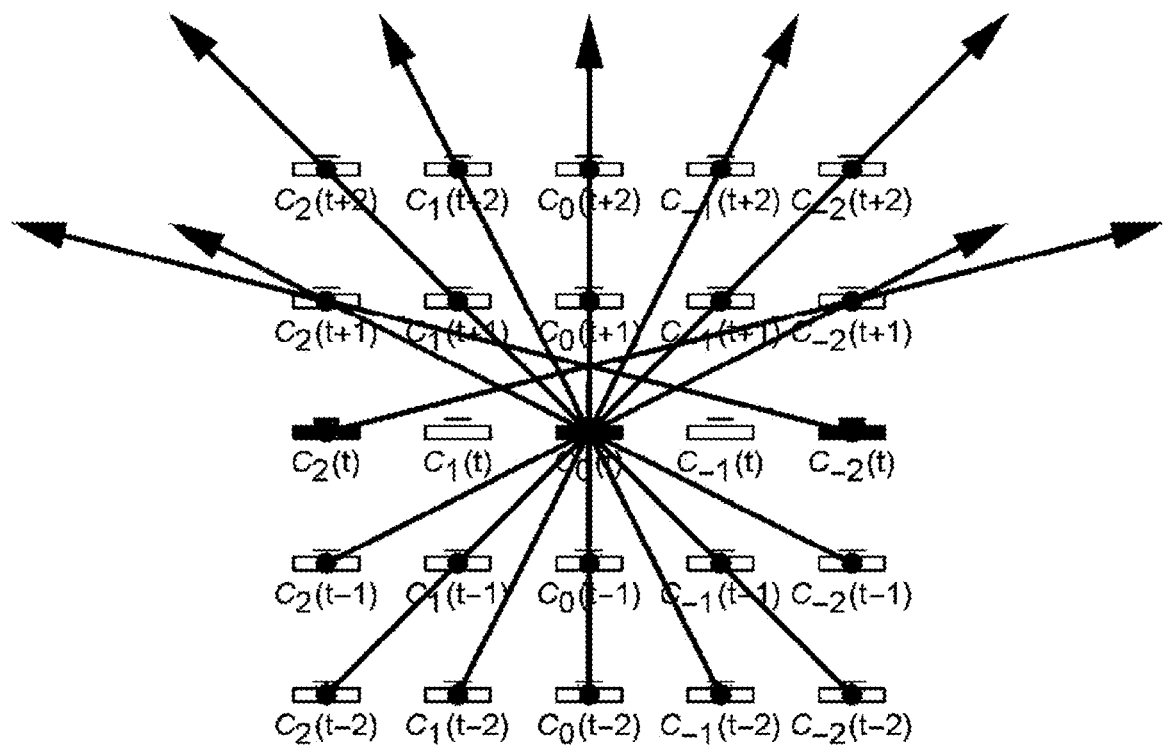
FIG. 19 illustrates multiple reference cameras that are used to obtain directions of limited disparity over a wide viewing range, for illustrating embodiments of the present invention.

The same principle is applied in the example of FIG. 19, where additional reference cameras are used, advantageously, to obtain directions of limited disparity over an wider viewing range.

Without a single-camera reference image, it is obviously also difficult to represent the regions of limited disparity in a single image. However, this situation can be visualized by replacing the regions of limited disparity by three-dimensional cones. Given a camera pair $C_i(t),C_j(t+k)$ and a value $\epsilon>0$, there is a pyramidal truncated cone in which the disparity is bounded. The apex of the cone coincides with $C_i(t)$. The cone is truncated to account for a minimal distance between the object and the cameras, for example 3 m, similar to the threshold on the viewing distance Z referred to hereinabove.

For each point inside the truncated cone the disparity will be at most E. Therefore, multiple pairs of camera images generate multiple cones of limited disparity.

To visualize the relative positions of the cones we may introduce a virtual plane in the scene located in front of the center of projection for at least one camera of the plurality of cameras. The intersection of each cone with this virtual plane is a rectangular region that can be projected onto the image plane of $C_0(t)$. The composition of all re-projected cone intersections then provides the new reference image. Alternatively, the multiple re-projections of the cone intersection may be considered on an individual basis, each one defining a separate reference image region, e.g. if transformation or index mapping of specific reference image regions is preferred over the transformation or index mapping of the entire reference image for shorter processing delays in some applications.

Within these cones, the disparity may still increase in a linear way, as the following expressions show. Let $X=(X, Y, Z, 1)^T$ be a point in space. Let $C_S=(X_S, Y_S, Z_S, 1)^T$ be the projection center of one of the cameras, and let $C_R=(X_R, Y_R, Z_R, 1)^T$ be the projection center of a reference camera. Although the cameras are not at arbitrary positions, it can be assumed that the image planes are parallel to each other (if not, this can be compensated for, as already discussed hereinabove). A straightforward calculation shows that the more general expressions for the two components of the disparity vector are:

$$\Delta_x = -\frac{f(X(Z_S - Z_R) + X_S(Z_R - Z) + X_R(Z - Z_S)) + Z_R(X - X_R)(Z_S - Z)}{(Z_S - Z)(Z - Z_R)}$$

$$\Delta_y = -\frac{f(Y(Z_S - Z_R) + Y_S(Z_R - Z) + Y_R(Z - Z_S)) + Z_R(Y - Y_R)(Z_S - Z)}{(Z_S - Z)(Z - Z_R)}$$

If the reference camera $C_R$ is placed at the origin, the equation hereinabove simplifies to $$(\Delta_x, \Delta_y)^T = \frac{f}{Z - Z_S}\left(X\frac{Z_S}{Z} - X_S, Y\frac{Z_S}{Z} - Y_S\right)^T,$$

in accordance with the equation previously discussed hereinabove (and also true for coplanar cameras) and also presented in detail in the examples hereinbelow.

The processor 3 is also adapted for applying a motion segmentation algorithm to the corresponding image regions.

The processor may be adapted for stitching together, using a stitching algorithm known in the art, the corresponding image regions and for applying the motion segmentation algorithm to the reference image, or a stitched image of the image regions of the reference image, and to the stitched image of the corresponding image regions. Alternatively or additionally, the processor may be adapted for applying the motion segmentation algorithm to each image region in the reference image and the corresponding image region in another image separately.

Advantageously, because the image regions are selected such that the effect of parallax is low, this parallax effect is easier to compensate, no matter which motion segmentation method is used. For example, the processor may be adapted for applying a motion segmentation algorithm that is specifically adapted for motion segmentation in image data captured by a camera that is static with respect to its background environment, even though embodiments of the present invention relate to a configuration of moving cameras. For example, typical difficulties of motion segmentation in a video sequence obtained by a camera or cameras mounted on a moving vehicle may be simplified or avoided by embodiments of the present invention.

The motion segmentation algorithm may be a motion segmentation algorithm known in the art. By controlling the parallax due to motion of the cameras, i.e. by selecting corresponding image regions at different points in time that are characterized by a low disparity due to parallax, motion compensated background models may become more robust, e.g. such that it is easier to discriminate between static and dynamic feature points using epipolar or structural constraints, and/or tighter flow vector bounds may be applied. In fact, since the parallax is small, a simple motion segmentation method with very limited motion compensation may be sufficient to achieve a good fidelity of the motion segmentation, e.g. requiring less processing power and cheaper hardware than prior-art solutions.

For example, the motion segmentation algorithm may comprise an image subtraction. Since background pixels may have a substantially constant intensity and/or color, differences may be indicative of foreground changes to be detected. The motion segmentation algorithm may comprise a mixture of Gaussians method, e.g. in which the intensity and/or color of each pixel is modelled as a mixture of Gaussian distributions. For example, static background regions may correspond to a small number of narrow Gaussian distributions, while foreground pixels may correspond to more and/or wider Gaussian components. The motion segmentation algorithm may define a model of each pixel or pixel region by a collection of samples instead of a parametric model, such as a mixture of Gaussians. The motion segmentation algorithm may take, instead of or in addition to variations in the color and/or intensity, local patterns and/or textures into account, e.g. Local Binary Patterns. The motion segmentation algorithm may comprise an adaptive background maintenance algorithm, e.g. to update a model and/or adjust a detection threshold of a background model dynamically.

The motion segmentation algorithm may comprise a foreground/background segmentation with motion compensation. For example, an optical flow between the image regions or stitched images may be determined as indicative, e.g. after local averaging, of an optical flow of the background. This may comprise a two-step optical flow analysis and/or a dual-mode single Gaussian model to reduce contamination of the background model. The motion segmentation algorithm may comprise a motion clustering algorithm to track features across different instants in time and to cluster these into different motion patterns. For example, a dominant pattern may be assumed to represent background motion. The motion segmentation algorithm may comprise a multi-body structure-from-motion algorithm, e.g. in which moving objects are assumed, in approximation, to be rigid. The motion segmentation algorithm may comprise a geometric constraint based method. The motion segmentation algorithm may comprise a moving object detection in which moving objects are detected by object recognition. For example, since the disparity due to camera motion is small in the identified corresponding image regions, it can be easier to identify moving objects that were recognized in distinct images.

In another example, a neural network, such as a convolutional neural network (CNN), may be trained to detect objects of interest, e.g. pedestrians, bikes, cars and/or other mobile objects that can be relevant in traffic situations, in which the neural network receives data provided by the motion segmentation algorithm as input, e.g. as an additional input for supplementing the image data (and/or data related to detected image features) on which an object detection implemented by the neural network operates. Thus, the neural network can be trained to detect a specific type (or types) of objects of interest in motion.

The processor 3 may also be adapted for applying an algorithm for compensating for a random motion to the images or to the corresponding image regions, e.g. before applying the motion segmentation algorithm. For example, when the cameras are mounted on a vehicle, random camera jitter may be unavoidable, due to unevenness of the road surface, vibration of the vehicle and/or wind. It may therefore be advantageous to perform some form of image stabilization as known in the art. The images may be stabilized directly by the camera (e.g., lens-based stabilization, sensor shift stabilization), or after the image has been captured by digital image stabilization. However, the shaking of the camera may be composed of mainly a pan and a tilt motion, with respect to a principal direction of motion of the system, e.g. of the vehicle, which is of a different nature than parallax. It is known in the art that such camera jitter, e.g. being substantially limited to translation and/or rotation in a plane perpendicular to the principal direction of motion, is easier to compensate for than the disparity caused by parallax.

Figure 3:
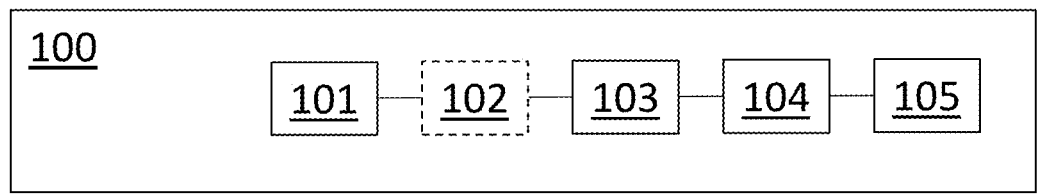
FIG. 3 illustrates an exemplary computer-implemented method for motion segmentation in accordance with embodiments of the present invention is shown.

In a third aspect, the present invention relates to a computer-implemented method. Referring to FIG. 3, an exemplary computer-implemented method 100 for motion segmentation in images obtained by a plurality of cameras that are moving with respect to a background environment in accordance with embodiments of the present invention is shown.

The method 100 comprises capturing 101 a temporal sequence of images with the plurality of cameras. The plurality of cameras may form part of a system in accordance with embodiments of the second aspect of the present invention.

A method in accordance with embodiments of the present invention may comprise measuring a position, a velocity and/or an acceleration of the plurality of cameras relative to the background environment.

The method may comprise, for at least two images, of the temporal sequence of images, that are obtained by at least two different cameras of the plurality of cameras at different points in time, determining 102 a transformation between the camera positions and/or orientations corresponding to the at least two images.

The method comprises determining 103 at least a pair of corresponding epipoles in the at least two images, for example by taking the determined transformation into account.

The method comprises defining 104 corresponding image regions of limited image disparity due to parallax around (e.g. at least comprising) the corresponding epipoles in the at least two images.

The method also comprises applying 105 a motion segmentation algorithm to said corresponding image regions.

A method in accordance with embodiments of the present invention may, particularly, comprise any step for which the processor 3 is specifically adapted for, as described hereinabove in relation to embodiments of the first and/or second aspect of the present invention.

In a first example, a theoretical framework relating to embodiments of the present invention is discussed, for the purpose of elucidating aspects of the present invention and for aiding the skilled person in reducing the invention to practice. However, embodiments of the present invention are not necessarily limited to such considerations.

In this example, the disparity due to parallax is discussed using a simple pinhole model for each camera and assuming an equal focal length f for the cameras.

Figure 5:
FIG. 5 shows two images taken by a single camera, mounted on a moving vehicle, at two sampling points in time, and a merged image in which the two images have been superimposed onto each other, for illustrating embodiments of the present invention.

FIG. 5 shows, in the top row, two frames taken by a single camera, mounted on a moving vehicle, at two consecutive sampling points in time. Beneath these frames, a merged image is shown, in which the two frames have been superimposed on each other. Since the vehicle moves forward, the common line of sight of the two camera positions, i.e. the line joining the two projection centers, points forward. As a result the disparity is much smaller at the center of the image than at the boundaries. In the field of stereo vison, such common line of sight could be referred to as the baseline of a stereo pair.

To determine the disparity for an arbitrary pair of camera positions, in this first example it will assume that the viewing directions are parallel to each other, i.e. the cameras are translated but not rotated relative to each other. The more general case of non-parallel viewing directions will be discussed in a further example hereinbelow.

Figure 4:
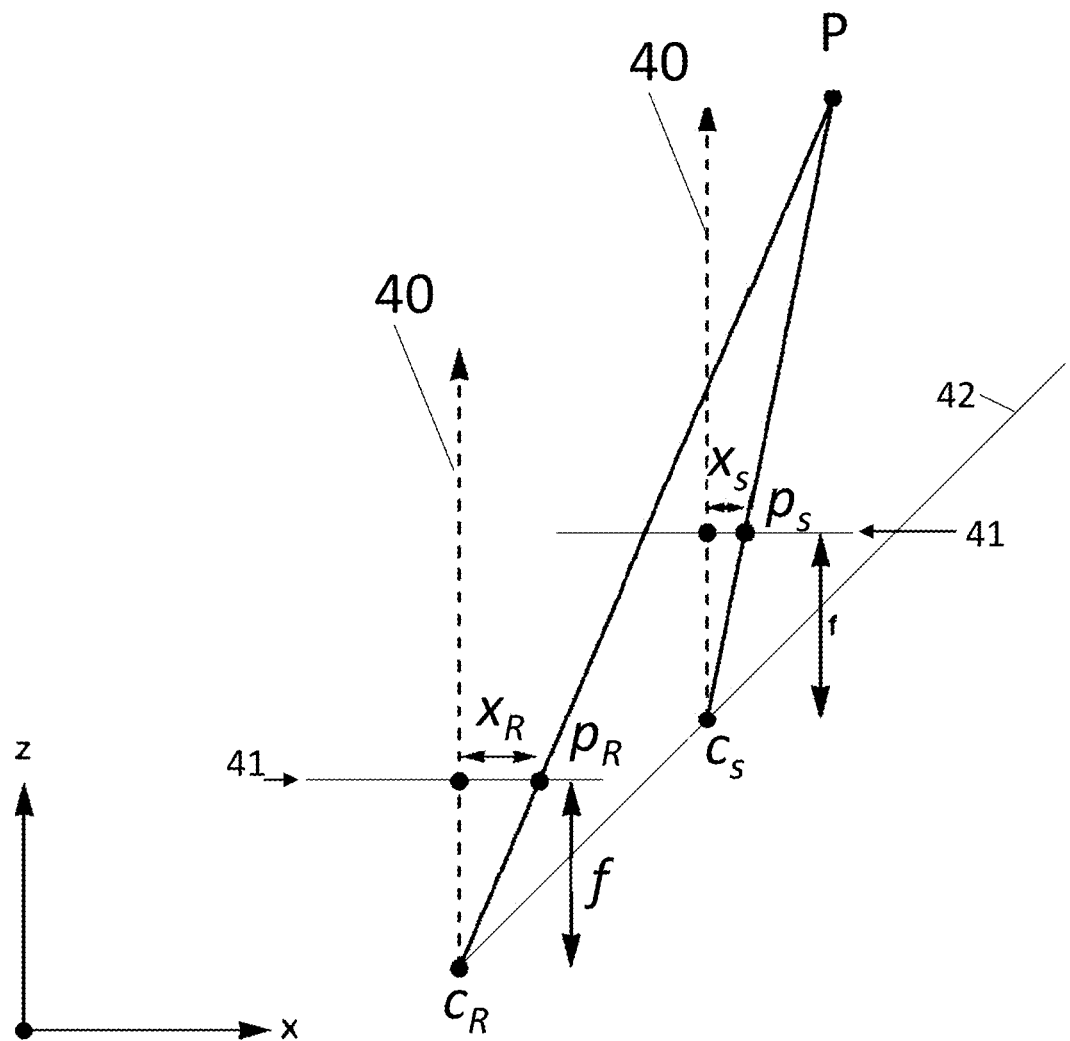
FIG. 4 schematically shows camera positions, in which a pinhole camera model is used to define the projection of a point onto two image planes, for illustrating embodiments of the present invention.

FIG. 4 shows a top down schematic view of the camera positions, in which the pinhole camera model is used to define the projection of a point p on the two image planes. In this example, the optical axes 40 are parallel to each other.

Let $X=(X,Y,Z,1)^T$ refer to the homogeneous coordinates of the point p in a three-dimensional space tied to a world reference frame, e.g. a reference frame of the background environment, e.g. a terrestrial reference frame. When two image frames are taken from two different camera positions of the same scene, e.g. due to a movement of the camera between the two instants in time when the image frames are captured, the projection of p on the two image planes 41, respectively referred to as $p_R$ and $p_S$, will not exactly be at the same position in these image planes. Particularly, due to parallax, there we will be a small offset, or disparity, between the two projections of p.

The x-component $x_S$ of the disparity of the projection $p_S$ of X as seen by the camera with projection center $C_S=(X_S, Y_S,Z_S)^T$ and the x-component $x_R$ of the projection $P_R$ as seen by the camera with projection center $C_R$ will be computed. The projection center $C_R$ can be selected, for convenience and without loss of generality, as the origin of the three-dimensional coordinate frame. The disparity due to parallax can be represented as a vector $(\Delta_x,\Delta_y)^T$. The x-component of the disparity is the difference between $x_R$ and $x_S$. The two points where the common line of sight crosses the respective image planes are called the epipoles.

For an object at $(X,Y,Z,1)^T$ the disparity, even for two coplanar cameras, can be expressed as:

$$(\Delta_x, \Delta_y)^T = \frac{f}{Z-Z_S}\left(X\frac{Z_S}{Z} - X_S, Y\frac{Z_S}{Z} - Y_S\right)^T.$$

The disparity is zero when $XZ_S=X_SZ$ and $YZ_S=Y_SZ$. Both equalities hold when X lies on the common line of sight 42 of the two camera positions, i.e. for any point of the form $(X,Y,Z)^T=(kX_S,kY_S,kZ_S)^T$, provided $k\neq0$ and $k\neq1$. Thus, the projection of a point on the common line of sight on each of the image planes 41 coincides with an epipole.

A closer analysis of the expression for the disparity, hereinabove, reveals that the components of the disparity vector are linear functions of X and Y when Z is fixed, and the x-component of the disparity is independent of any of the y-coordinates, and vice versa. Also, when two distinct objects lie on a same line of sight as seen from the camera at the origin $C_R$, the disparity of the most distant object is always smaller than the disparity of the closest object.

The expression hereinabove expresses the disparity between the two image points of an object at location $(X,Y,Z,1)^T$. This disparity can also be expressed as a function of the location of the projection of $(X,Y,Z,1)^T$ onto one of the image planes and the depth Z of the object. Le $$\begin{bmatrix}x\\y\\1\end{bmatrix} = \begin{bmatrix}fX/Z\\fY/Z\\1\end{bmatrix}$$

denote the projection of $(X,Y,Z,1)^T$ onto the image plane of the reference camera, i.e. having its projection center $C_R$ at the origin. Replacing X by xZ/f and Y by yZ/f in the expression hereinabove, we obtain, assuming cameras which are not coplanar with respect to each other, $$(\Delta_x, \Delta_y)^T = \frac{Z_S}{Z-Z_S}\left(x - f\frac{X_S}{Z_S}, y - f\frac{Y_S}{Z_S}\right)^T,$$

or equivalently, $$(\Delta_x, \Delta_y)^T = \frac{Z_s}{Z-Z_s}(x - e_x^S, y - e_y^S)^T,$$

where $$(e_x^S, e_y^S, 1)^T = \left(f\frac{X_S}{Z_s}, f\frac{Y_S}{Z_s}, 1\right)^T$$

represents the epipole in the image plane of the reference camera defined by the common line of sight of $C_R$ and $C_S$.

Furthermore, for $$Z \gg Z_s, (\Delta_x, \Delta_y)^T \approx \frac{Z_s}{Z}(x - e_x^S, y - e_y^S)^T.$$

Hence, if the depth of the object is much larger than the difference in depth between the cameras, the disparity becomes inversely proportional to the depth of the object.

Let $p_w,p_h$ denote the width and height of a pixel, then the pixel at location (i,j), has image coordinates $(x,y)=(ip_w,jp_h)$. Replacing x and y by, respectively, $ip_w$ and $jp_h$ in the expression hereinabove, we find that the disparity of $(X,Y,Z,1)^T$ that projects onto (i,j) is equal to $$\frac{Z_S}{Z-Z_S}\left(i-\frac{e_x^s}{p_w}, j-\frac{e_y^s}{p_h}\right)^T,$$

where the disparity is now expressed by the number of pixels over which the image of the point p is shifted.

Since the disparity decreases when an object is further away, if the distance in the z-direction between the camera position at the origin and the object is at least d, with d>$Z_S$, then, expressed in the world coordinate system anchored at $C_R$, $$|\Delta_x| \le \frac{f}{d-Z_S}\left|X\frac{Z_S}{d}-X_S\right|,$$

$$|\Delta_y| \le \frac{f}{d-Z_S}\left|Y\frac{Z_S}{d}-Y_S\right|.$$

These bounds show that regions of limited disparity can be defined in the image of the reference camera that only depend on the pixel coordinates of the projected object point, insofar the object is at least a predetermined distance away from the reference camera position. These bounds are also applicable to coplanar cameras.

Figure 6:
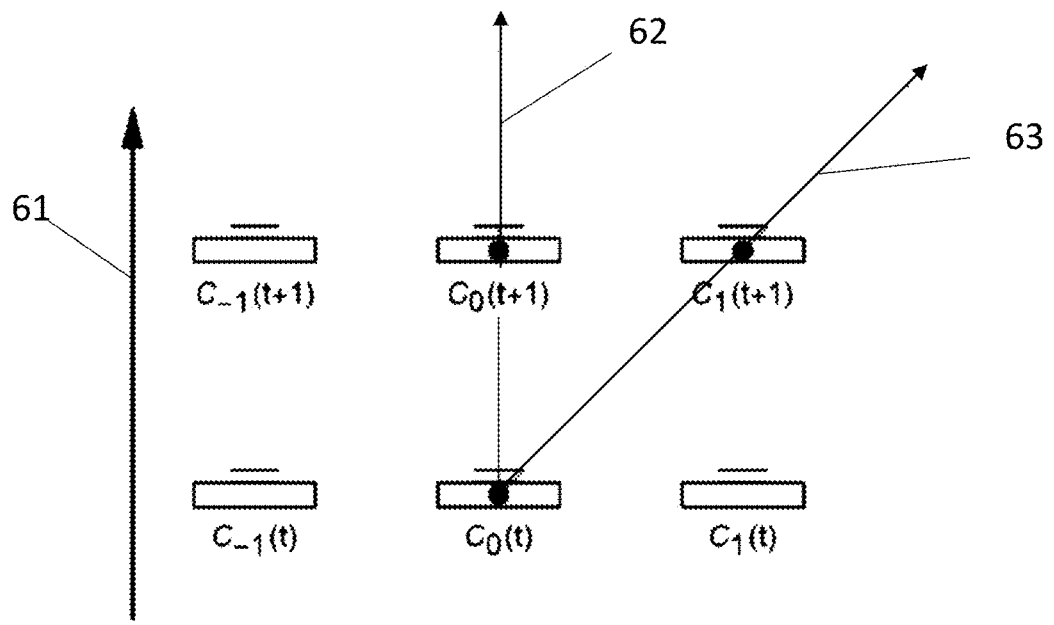
FIG. 6 shows two consecutive positions in time of a moving linear camera array comprising three cameras.

To further illustrate this example, FIG. 6 shows a schematic top view of two consecutive positions of a linear camera array comprising three cameras, respectively having projection centers $C_{-1}$, $C_0$, $C_1$ as function of time, on a vehicle that drives along a direction 61. The position of the projection centers of the cameras are denoted as $C_i(t)$, $C_i(t+1)$, . . . . The common line of sight 62 of camera $C_0$ at instant t and of $C_0$ at instant t+1 is a straight line passing through $C_0(t)$ and $C_0(t+1)$. Likewise, the common line of sight 63 of $C_0(t)$, $C_1(t+1)$ is a second straight line passing through the respective camera centers.

Figure 7:
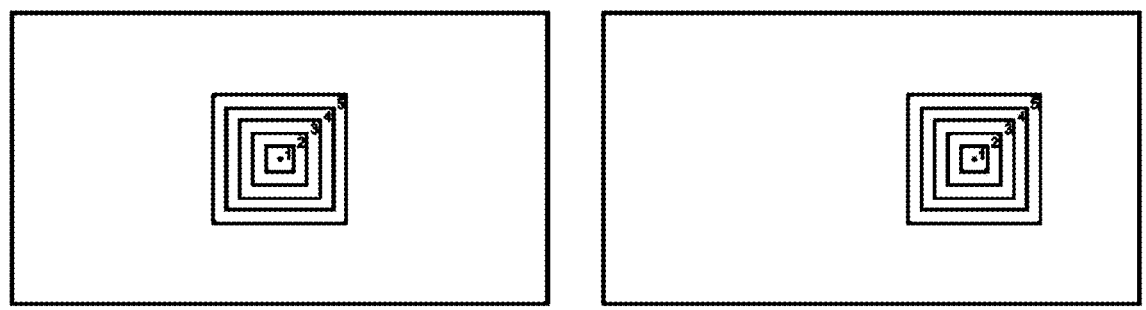
FIG. 7 shows regions in an image of a reference camera, in which region the x-component and the y-component of the disparity are below the thresholds of respectively 1, 2, 3, 4 and 5 pixels, for illustrating embodiments of the present invention.

FIG. 7 shows regions in the image of the reference camera $C_0$ where the x-component and the y-component of the disparity stay below the thresholds of 1, 2, 3, 4 and 5 pixels, as respectively indicated by the smallest to largest squares (the yet larger rectangles depict the boundary of the image frame). The regions are shown, in the illustration on the left, for the camera pair $C_0(t)$, $C_0(t+1)$, and, in the illustration on the right, for the camera pair $C_0(t)$, $C_1(t+1)$. This example corresponds to the following camera configuration:

the lateral distance between two neighboring camera centers along the array is 10 cm;
the speed of the vehicle is 15 m/s;
the frame rate is 60 frames per second (fps);
the traveled distance between two consecutive snapshots, i.e. at t and t+1, is 25 cm;
the resolution of each camera is 768×432 pixels;
the viewing angle of each camera is 92.6°, and
the focal length of each camera is 2.948 mm.

This drawing thus illustrates the disparity for two different camera pairs in terms of pixels. The squares delimit the regions in which $|\Delta_x|$, $|\Delta_y|\le k$, where the value of k is 1, 2, 3, 4 and 5 for the smallest to the largest square. The disparity is zero at the center of each set of concentric squares. These centers coincide with the epipoles for the respective camera position pairs, which, as defined, is the image point where the common line of sight meets the image plane. For example, for an object at a depth of 5 meter, $$\frac{Z_S}{Z-Z_S}=\frac{0.25}{5-0.25}=\frac{1}{19}.$$

For example, in this illustration, at 85 pixels to the right of the epipole, according to the equation provided hereinabove, the disparity $|\Delta_x|$ will be $$\frac{85}{19}=5$$

pixels.

Figure 8:
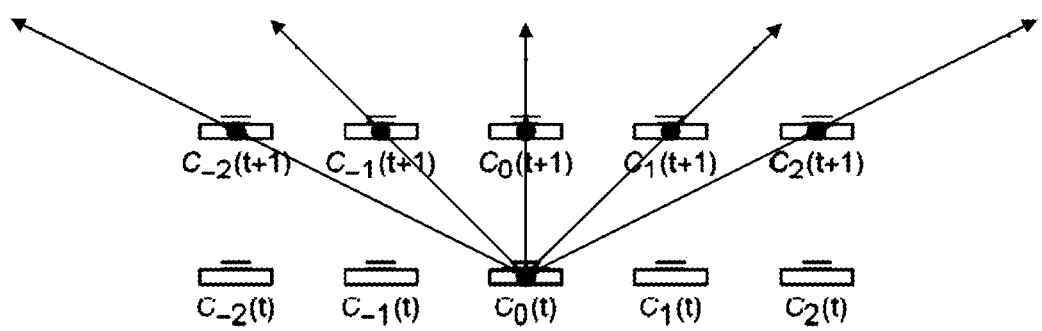
FIG. 8 shows a linear array of five cameras, in which two consecutive snapshots are taken by each camera while the array moves forward, for illustrating embodiments of the present invention.

FIG. 8 shows a further example, in line with the previous example, illustrating a linear array of five cameras, mounted on a vehicle. Two consecutive snapshots are taken by each camera, while the vehicle drives forward.

Figure 9:
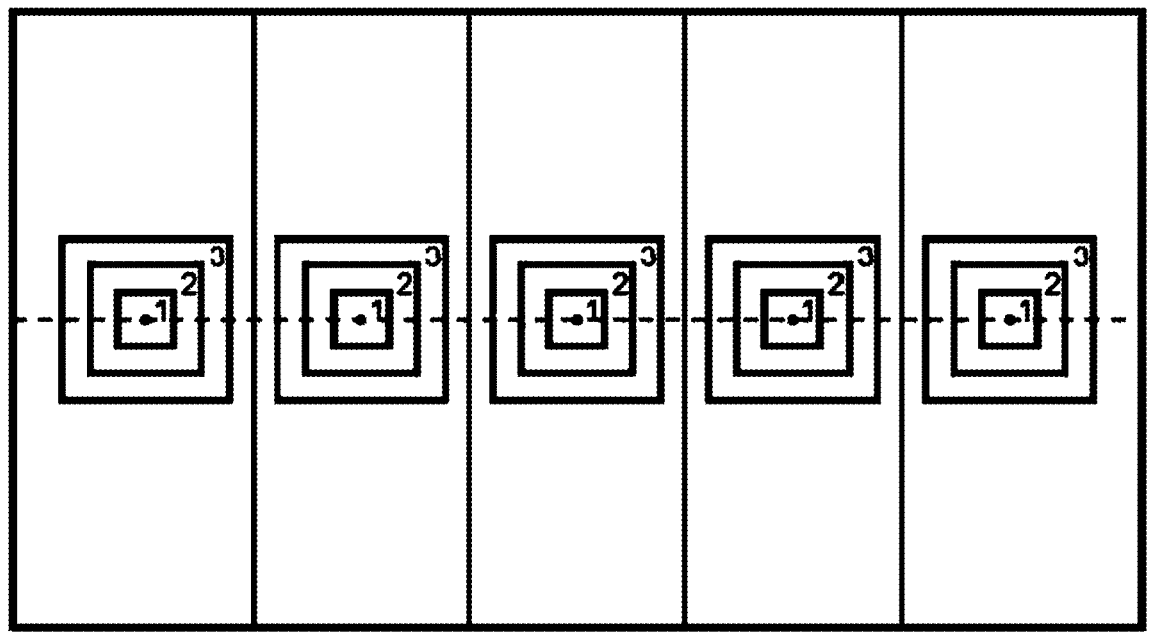
FIG. 9 shows different sub-regions of an image with their associated disparity, corresponding to five different camera pairs, for illustrating embodiments of the present invention.

FIG. 9 shows different subregions of the image with their limited disparity, indicated for 5 different camera pairs. The disparity bound is expressed as the maximal number of pixels that the projection of p is possibly shifted when comparing to its projection in the image plane of $C_i(t+1)$ to the projection in the image plane of $C_0(t)$. In each square region, the absolute value of both components of the disparity vector is at most k, for k=1, 2, 3 (the numeral values indicated in the drawing refer to these values k). Also indicated are five large rectangular zones representing a partitioning of the entire image frame. Each zone corresponds to one camera pair for which the disparity for each pixel in the zone is less than the disparity for any other pair.

Figure 10:
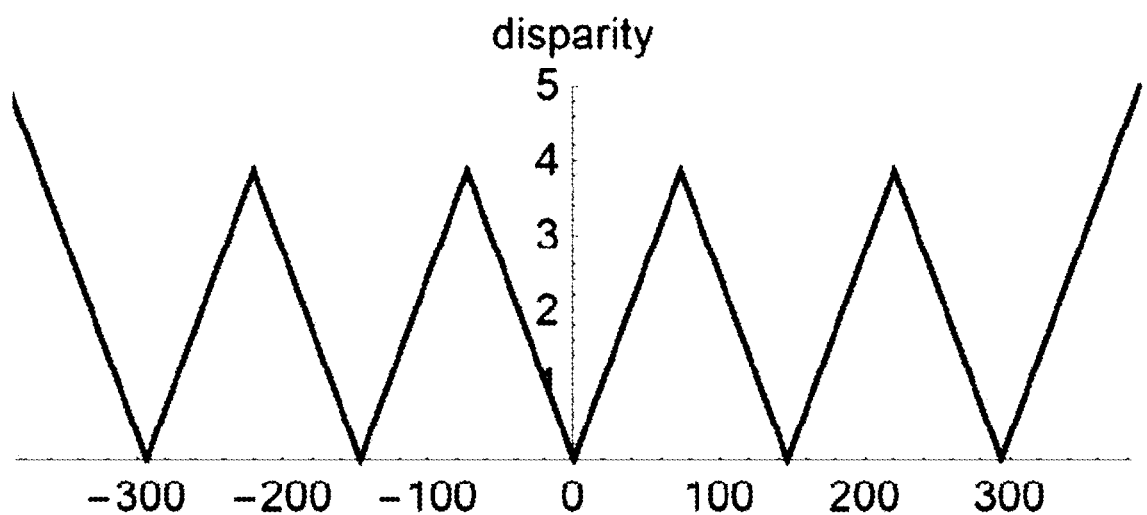
FIG. 10 shows the limited disparity as a function of the pixel x-coordinate, along a horizontal line passing through the center of the image, for illustrating embodiments of the present invention.

FIG. 10 shows the limited disparity, e.g. the absolute value of $\Delta_x$, as function of the pixel x-coordinate, along a horizontal line passing through the middle of the image, e.g. as indicated by the dashed line in FIG. 9. At the center of each subregion the parallax is zero for the corresponding pair of camera positions.

Extending upon the first example discussed hereinabove, in a second example, the theoretical framework relating to embodiments of the present invention is further elaborated for large collinear subsets of camera positions. This example is provided for the purpose of elucidating aspects of the present invention and for aiding the skilled person in reducing the invention to practice. However, embodiments of the present invention are not necessarily limited to such considerations.

The combination of snapshots is not limited to camera pairs. Within a camera arrangement, any subset of n collinear cameras determines a subregion of low parallax and can be used for motion segmentation. In fact, it may be advantageous to use a larger subset of cameras as it provides more information for a background model.

Figure 11:
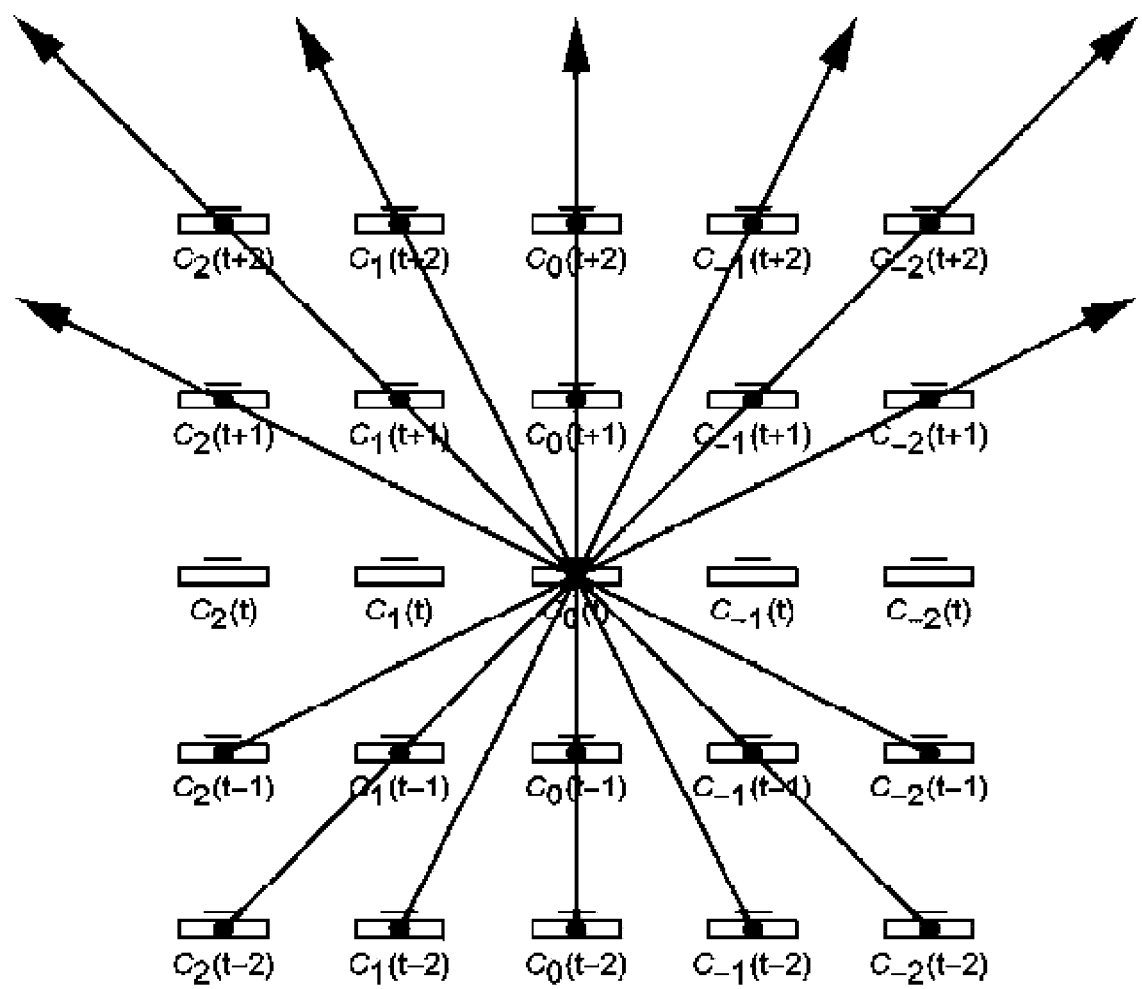
FIG. 11 shows seven distinct camera subsets, indicated by their common lines of sight, for illustrating embodiments of the present invention.

In FIG. 11, seven distinct camera subsets have been indicated by their common lines of sight. Four subsets contain 3 cameras, for example, $C_2(t+1)$, $C_0(t)$, $C_{-2}(t-1)$, while three subsets contain 5 cameras, for example, $C_2(t+2)$, $C_1(t+1)$, $C_0(t)$, $C_{-1}(t-1)$, $C_{-2}(t-2)$. To obtain such larger subsets, snapshots taken at camera positions in front of the central camera, but also snapshots taken at positions behind the central camera, can be combined.

For each subset associated with a common line of sight the point where the disparity becomes zero in the image plane of the reference camera will be the same for all cameras. However, away from this point, the disparity will increase faster for cameras that are more distant from the reference camera than the disparity of cameras that are close to it. According to the disparity equation provided hereinabove, this is a linear relation: the disparity for the pair $C_0(t)$, $C_2(t+2)$ will increase twice as fast as the disparity for the pair $C_0(t)$, $C_1(t+1)$, because $C_2(t+2)$ is two times further from the reference camera $C_0(t)$.

The complication that the disparity varies differently, may not be a problem as long as the disparity is sufficiently small. Furthermore, the motion segmentation along a common line of sight, for such a larger set of camera pairs, can be further optimized. For example, a single motion segmentation algorithm can be applied to the snapshots taken at $C_2(t+2)$, $C_1(t+1)$, $C_0(t)$, $C_{-1}(t-1)$, $C_{-2}(t-2)$, while neglecting the somewhat larger disparity of $C_2(t+2)$ and $C_{-2}(t-2)$. Alternatively, a motion segmentation can be performed separately on the different pairs or triples of a common line of sight set, e.g. the following triples:

(i) $C_2(t+2)$, $C_1(t+1)$, $C_0(t)$
(ii) $C_1(t+1)$, $C_0(t)$, $C_{-1}(t-1)$
(iii) $C_0(t)$, $C_{-1}(t-1)$, $C_{-2}(t-2)$.

The results of these individual motion segmentations, e.g. due to their common frame of reference of $C_0(t)$, can then be combined.

Figure 12:
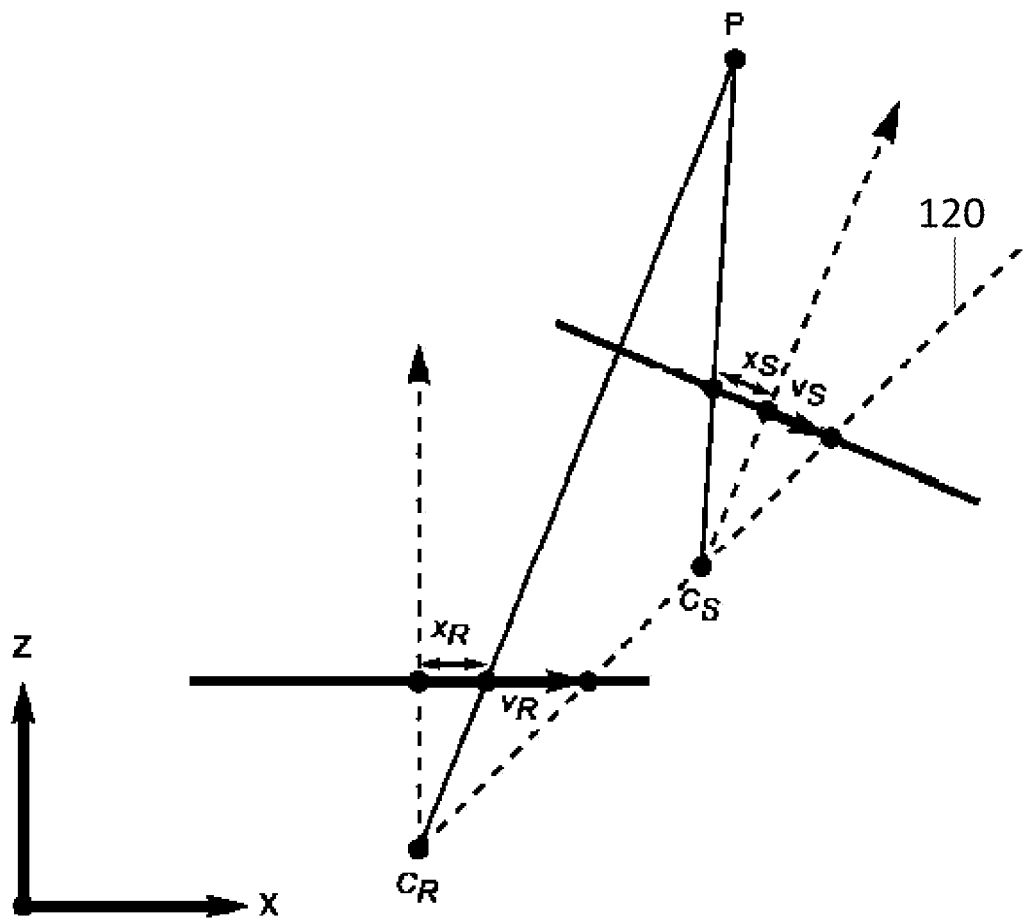
FIG. 12 illustrates a case where the image planes of the cameras are not parallel, for illustrating embodiments of the present invention.

In a further example, embodiments of the present invention not being limited thereto, the more general case where the image planes of the cameras are not parallel is discussed, as illustrated in FIG. 12. The line 120 through the camera positions $C_S, C_R$ represents the common line of sight.

Let $X=(X,Y,Z,1)^T$ denote the homogeneous coordinates of a 3D world point (also referred to as the object point). The camera effects a mapping to a homogeneous 2D image point $x=(x,y,1)^T$ described by $$kx = \begin{bmatrix} kx \\ ky \\ k \end{bmatrix} = PX.$$

The 3×4 projection matrix P depends on the camera parameters (e.g. focal distance) as well as the camera location (specifically the 3D world coordinates of the camera center) and orientation relative to the world coordinate axes. It can be decomposed as P=K [R|t], in which [R|t] is the rotation matrix R that aligns the world axes with the camera axes, augmented by the translation vector t between the origin of world axes and the camera center C, expressed in camera coordinates. More specifically, for a camera located at $\tilde{C}_S=(X_S,Y_S,Z_S)^T$, the translation t equals $t=-R\tilde{C}_S$.

K is a 3×3 matrix containing the intrinsic camera parameters necessary to model the scaling and skew between normalized sensor plane coordinates and pixel coordinates. E.g. for a camera with square pixels and no skew, it is given by $$K = \begin{bmatrix} f & 0 & x_0 \\ 0 & f & y_0 \\ 0 & 0 & 1 \end{bmatrix},$$

where f is the focal length expressed in pixels, i.e. the actual focal distance divided by the physical width of one pixel, and $(x_0, y_0)$ are the pixel coordinates of the principal point (i.e. the projection of the line that goes through the projection center of the camera and is perpendicular to the sensor plane).

The disparity vector of a world point for a pair of cameras is defined as the difference between its pixel coordinates in one camera and the its pixel coordinates in the other. Let the projection matrix of the first camera (see the equation $kx=PX$) be denoted by $P_R$ and of the second camera as $P_S$, then the disparity of a point with world coordinates (X,Y, Z,1)$^T$ satisfies $(\Delta_x, \Delta_y)^T = (x_S, y_S)^T - (x_R, y_R)^T$ where $(x_R, y_R)^T$ and $(x_S, y_S)^T$ are the inhomogeneous vectors that represent the two image points of X. Using the projection matrices of the cameras, these points can be derived from $(kx_R, ky_R, k)^T = P_R X,$ $(lx_S, ly_S, l)^T = P_S X.$ Thus, from these equations, it follows that a generalized equation for the disparity can be written as:

$$\Delta_x = \frac{p_{11}^S X + p_{12}^S Y + p_{13}^S Z + p_{14}^S}{p_{31}^S X + p_{32}^S Y + p_{33}^S Z + p_{34}^S} - \frac{p_{11}^R X + p_{12}^R Y + p_{13}^R Z + p_{14}^R}{p_{31}^R X + p_{32}^R Y + p_{33}^R Z + p_{34}^R},$$

$$\Delta_y = \frac{p_{21}^S X + p_{22}^S Y + p_{23}^S Z + p_{24}^S}{p_{31}^S X + p_{32}^S Y + p_{33}^S Z + p_{34}^S} - \frac{p_{21}^R X + p_{22}^R Y + p_{23}^R Z + p_{24}^R}{p_{31}^R X + p_{32}^R Y + p_{33}^R Z + p_{34}^R},$$

with $p_{ij}^R$ and $p_{ij}^S$ denoting the elements at row i and column j of $P_R$ and $P_S$ respectively.

To illustrate this, the specific case of two identical cameras with focal length f and principal point at (0,0) and perfectly parallel viewing directions is considered. Without loss of generality, the world axes can be chosen such that the first camera $C_R$ is at the origin, and the projection center of the second camera is at $C_S=(X_S,Y_S,Z_S,1)^T$. Furthermore, the camera axes can be aligned with world axes so that the rotation matrix R for both cameras is equal to the identity matrix. The disparity for a point $X=(X,Y,Z,1)^T$ then reduces to $$(\Delta_x, \Delta_y)^T = \frac{f}{Z - Z_s}\left(X\frac{Z_S}{Z} - X_S, Y\frac{Z_S}{Z} - Y_S\right)^T,$$

i.e. reduces to the equation as presented hereinabove in a previous example.

When considering the case where two cameras have different focal lengths $(f_R, f_S)$, and in which the second camera has a yaw angle equal to $\alpha$ and a tilt angle equal to $\beta$, the rotation matrix, which represents the orientation of the coordinate frame of the second camera, is $$R = \begin{pmatrix} \cos\alpha & 0 & \sin\alpha \\ \sin\alpha\sin\beta & \cos\beta & -\cos\alpha\sin\beta \\ -\cos\beta\sin\alpha & \sin\beta & \cos\alpha\cos\beta \end{pmatrix}.$$

Again assuming the principal point to be at (0,0), the following equation is obtained:

$$\Delta_x = f_S \frac{(X - X_S)\cos\alpha + (Z - Z_S)\sin\alpha}{-(X - X_S)\sin\alpha\cos\beta + (Y - Y_S)\sin\beta + (Z - Z_S)\cos\alpha\cos\beta} - f_R \frac{X}{Z}$$

$$\Delta_y = f_S \frac{(X - X_S)\sin\alpha\sin\beta + (Y - Y_S)\cos\beta + (Z - Z_S)\cos\alpha\sin\beta}{-(X - X_S)\sin\alpha\cos\beta + (Y - Y_S)\sin\beta + (Z - Z_S)\cos\alpha\cos\beta} - f_R \frac{Y}{Z}$$

Even when the second camera is rotated, the parallax will still be zero for points that lie on the common line of sight. This is not immediately obvious, however, when comparing the two images, since relative to the image centers, the position of the epipole of the first camera (where the common line of sight crosses the image plane) will not be the same as the position of the epipole of the second camera. A simple method to bring the disparity back to zero at the epipoles is to shift each image by a translation that displaces the center of each image towards its epipole. Equivalently, the first image may remain at its original position and the second image may be translated by the difference of the translation vectors.

Referring to FIG. 12, the image of the reference camera can be translated by $v_R$, while the image of the second camera can be translated by $v_S$. Equivalently, the first image may remain at its original position and the second image may be translated by $v_S - v_R$.

Referring back to the example where two cameras have different focal lengths ($f_R, f_S$), and in which the second camera has a yaw angle equal to $\alpha$ and a tilt angle equal to $\beta$, the following equation can be obtained:

$$v_S - v_R = \left( -f_R \frac{X_S}{Z_S} + f_S \frac{(X_S \cos\alpha + Z_S \sin\alpha)}{-X_S \sin\alpha \cos\beta + Y_S \sin\beta + Z_S \cos\alpha \cos\beta}, \right.$$
$$\left. -f_R \frac{Y_S}{Z_S} + f_S \frac{(X_S \sin\alpha \sin\beta + Y_S \cos\beta - Z_S \cos\alpha \sin\beta)}{-X_S \sin\alpha \cos\beta + Y_S \sin\beta + Z_S \cos\alpha \cos\beta} \right)^T.$$

The above translation depends on the extrinsic parameters of the second camera (position and rotation angles) and the focal lengths $f_R$ and $f_S$.

After translating the second image, the disparity will be $(\Delta_x^{al}, \Delta_y^{al})^T = (\Delta_x, \Delta_y)^T - (\tau_x, \tau_y)^T$, where $(\tau_x, \tau_y)^T = v_S - v_R$.

The image alignment of the previous example, which applies a translation to one of the images, describes a simple way to make sure that the disparity is zero at the epipoles. A second, more sophisticated, method is to apply a homography to one of the images before comparing them, which homography not only ensures zero disparity at the positions of the epipoles, but also for any static object at a given distance.

The so-called infinite homography $H_\infty$ is a two-dimensional transformation that maps the vanishing points between the images. After applying it to one of the images, all points that lie at infinity will be seen at the same image location in both images. As a result their disparity will become zero. For all other points the new disparity $(\Delta_x^\infty, \Delta_y^\infty)$ can be found from $(\Delta_x^\infty, \Delta_y^\infty)^T = (x_R, y_R)^T$, where we introduced the image point $(kx_S^\infty, ky_S^\infty, k)^T = H_\infty P_S X$, which results from applying the homography $H_\infty$ to the image of the second camera.

Considering again the exemplary camera configuration in which the second camera is rotated by a tilt and a yaw angle, the following 2D homography may be applied:

$$\begin{bmatrix} x' \\ y' \\ w' \end{bmatrix} = H_\infty \begin{bmatrix} x \\ y \\ 1 \end{bmatrix}$$

to the image of the second camera, where $$H_\infty = \begin{pmatrix} \frac{f_R \cos\alpha}{f_S} & \frac{f_R \sin\alpha \sin\beta}{f_S} & -f_R \cos\beta \sin\alpha \\ 0 & \frac{f_R \cos\beta}{f_S} & f_R \sin\beta \\ \frac{\sin\alpha}{f_S} & -\frac{\cos\alpha \sin\beta}{f_S} & \cos\alpha \cos\beta \end{pmatrix}.$$

It can easily be shown that, after applying $H_\infty$, the disparity that remains is $$(\Delta_x^\infty, \Delta_x^\infty)^T = \frac{f_R}{(Z - Z_S)} \left( X \frac{Z_S}{Z} - X_S, Y \frac{Z_S}{Z} - Y_S \right)^T,$$

which is exactly the same as obtained by a previous equation hereinabove. Moreover, it can be noted that $(\Delta_x^\infty, \Delta_x^\infty)$ does not depend on $f_S$. The infinite homography does not only take the rotation of the second camera into account, but also the difference in focal lengths.

Thus, by applying a homography to the second image, any misalignment of the cameras as well as a difference between focal lengths can be taken into account. The images or parts thereof may be resampled to the same pixel grid after such transformation to enable an efficient further processing of the images or regions thereof, e.g. by applying a method for pixel interpolation as known in the art.

It has thus been demonstrated that a homography can be used to make the disparity zero for all points that lie at infinity. The same technique can be applied to any plane in the scene. For example, a homography $H_\tau$ may be computed to make the disparity disappear for all points that lie at a certain depth from the reference camera, that is, all points that lie on the plane $Z=\tau$, where $\tau$ is a predefined depth.

As another example, for illustrating the geometrical configuration of an array as discussed earlier hereinabove, consider the following scenario, embodiments of the present invention not being limited thereby. An application calls for a 90 degree field of view, at speeds up to 30 m/s, with a foreground-background segmentation algorithm that gives good results for frame rates no lower than 5 Hz and that can compensate for disparities of up to 3 pixels. Below speeds of 10 m/s and for obstacles within 10 m from the vehicle, other sensors handle the emergency braking. An inexpensive 640×480 resolution camera is paired with a lens that yields the required field of view (focal length equivalent to 320 pixels). The camera can run at a maximum frame rate of 100 Hz. This yields a horizontal array span of 30 cm. At 5 Hz and 10 m/s, the longitudinal distance within the virtual array is 2 m. A maximum disparity of 3 pixels then yields horizontal camera spacing of no more than 15 cm. The array for this application could therefore comprise 3 of these cameras.

In a next example, embodiments of the present invention not being limited thereby, a camera pair index map is discussed. Consider a camera array with n+1 cameras at positions: $C_0=(0,0,0,1)^T$, $C_1=(X_1,Y_1,Z_1,1)^T$, ..., $C_n=(X_n, Y_n, Z_n, 1)^T$, where $C_0$ is used as the reference camera. First, it can be assumed that the line of sight of the reference camera coincides with the driving direction, i.e. its tilt and yaw angles are substantially zero. For the other cameras, it can be assumed that they are either aligned with the reference camera, or have a non-zero tilt and yaw angle but the images obtained thereby are rectified, e.g. by an infinite homography as explained hereinabove.

While the vehicle moves forward, the cameras will take m+1 snapshots at positions $C_n + (0, 0, kv(t)\Delta t)$, k=0,1, ..., m, where $v(t)$ represents the speed of the system of moving cameras, e.g. of a vehicle on which the cameras are mounted, and $\Delta t$ represents the time between two subsequently acquired images. For convenience, it can also be assumed that the speed barely changes over $\Delta t$, that is, $v(t+\Delta t) \approx v(t) \approx v$, e.g. in accordance with normal driving behavior. Furthermore, $\Delta s = v\Delta t$ with will represent the distance traveled between two subsequent image acquisitions. Thus, the camera positions for the $k^{th}$ acquisition are $C_n + (0, 0, k\Delta s)$, k=0, 1, ..., m.

It will be shown that a simple method can be defined to determine, for a given value of v and $\Delta t$, which camera pair can be used for which part of the image to obtain the smallest possible disparity. Consider the disparity in the image pair $$(\Delta_x, \Delta_y)^T = \frac{Z_S}{Z - Z_S}\left(x - f\frac{X_S}{Z_S}, y - f\frac{Y_S}{Z_S}\right)^T,$$

which was introduced previously hereinabove. The image point $$(e_x^S, e_y^S, 1)^T = \left(f\frac{X_S}{Z_S}, f\frac{Y_S}{Z_S}, 1\right)^T$$

represents the epipole. In the following derivations, epipoles are assumed to not lie at infinity. A more general disparity formula for all cases, including epipoles at infinity, can be substituted if needed, using the generalized expressions indicated previously.

The disparity for an object at distance Z=d between the reference camera and camera $C_i$ taking a snapshot at $k\Delta t$ is then $$\Delta^{i,k}(x, y; d, \Delta s) = \frac{Z_i + k\Delta s}{d - (Z_i + k\Delta s)}(x - e_x^{i,k}, y - e_y^{i,k})^T,$$

where $$(e_x^{i,k}, e_y^{i,k}, 1)^T = \left(\frac{fX_i}{Z_i + k\Delta s}, \frac{fY_i}{Z_i + k\Delta s}, 1\right)$$

is the epipole. Furthermore, $\mu(x,y; d,\Delta s) =_{i,k} \min|\Delta^{i,k}(x,y; d,\Delta s)|$ can be defined as the function that gives for each point (x,y) in the image the magnitude of the smallest disparity vector over all possible camera pairs $\{C_0, C_i\}$, and time instants $k\Delta t$. Furthermore, let $\omega(x,y; d,\Delta_S) =_{i,k} \arg\min|\Delta^{i,k}(x,y; d,\Delta_S)|$ represent a camera index map that indicates, for each point in the image of the reference camera, which snapshot gives the lowest disparity. More specifically, for each (x,y), $\omega(x,y; d,\Delta s)$ yields a pair $\{i,k\}$ indicating that the kth snapshot taken by camera $C_i$ provides the lowest disparity.

Figure 15:
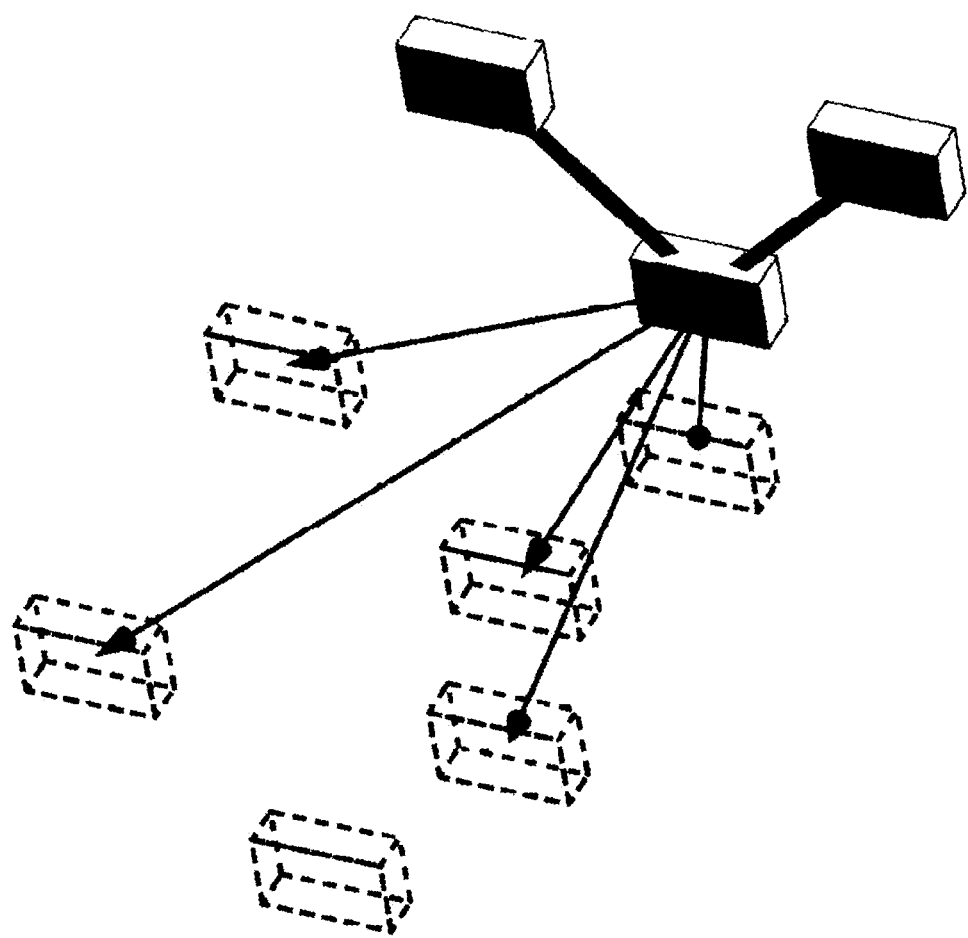
FIG. 15 shows a triangular configuration of three cameras taking snapshots at three points in time, for illustrating embodiments of the present invention.
Figure 16:
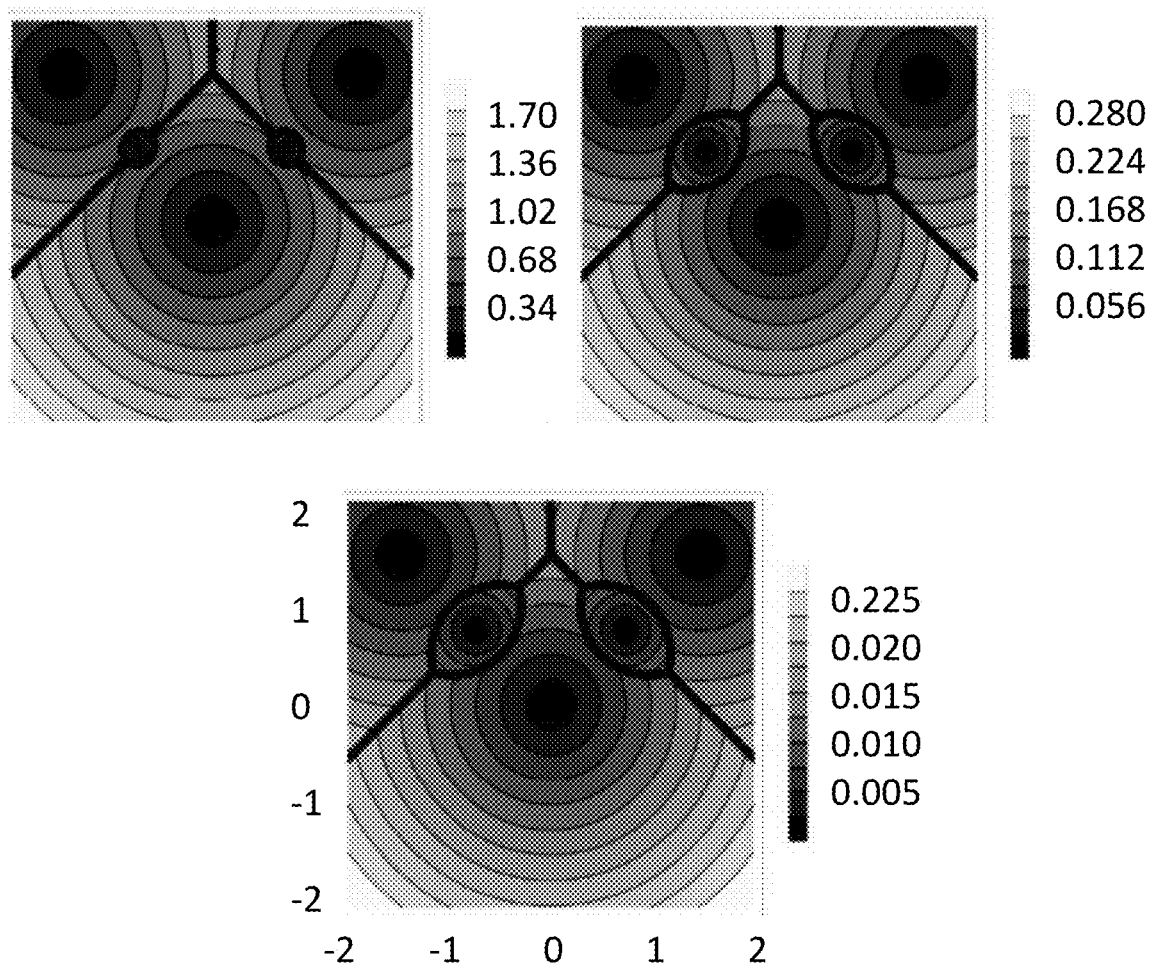
FIG. 16 shows the position of the region boundaries as depending on the distance to the object, for illustrating embodiments of the present invention.

To illustrate this, FIG. 15 shows a triangular configuration of three cameras taking snapshots at t=0, v$\Delta t$, 2v$\Delta t$. The images of five different camera positions are compared to the image of the reference camera, as indicated by the black arrows. FIG. 16 shows $\mu(x,y; d,\Delta_S)$ for three different values of the object distance d, respectively d=0.5 m, d=2 m and d=20 m for respectively left to right and top to bottom. The disparity is given in mm for a region of 2×2 mm on the image of the reference camera. In each case the image is covered by 5 distinct regions, such that in each region the minimal disparity is due to one specific camera pair. For example, the region that contains the center of the image always corresponds to the pair $\{(0,0,0), (0,0,\Delta_S)\}$. The two small eye-shaped regions correspond to the two long arrows in FIG. 15, for which the reference image is compared with snapshots taken at 2$\Delta$s.

Figure 17:
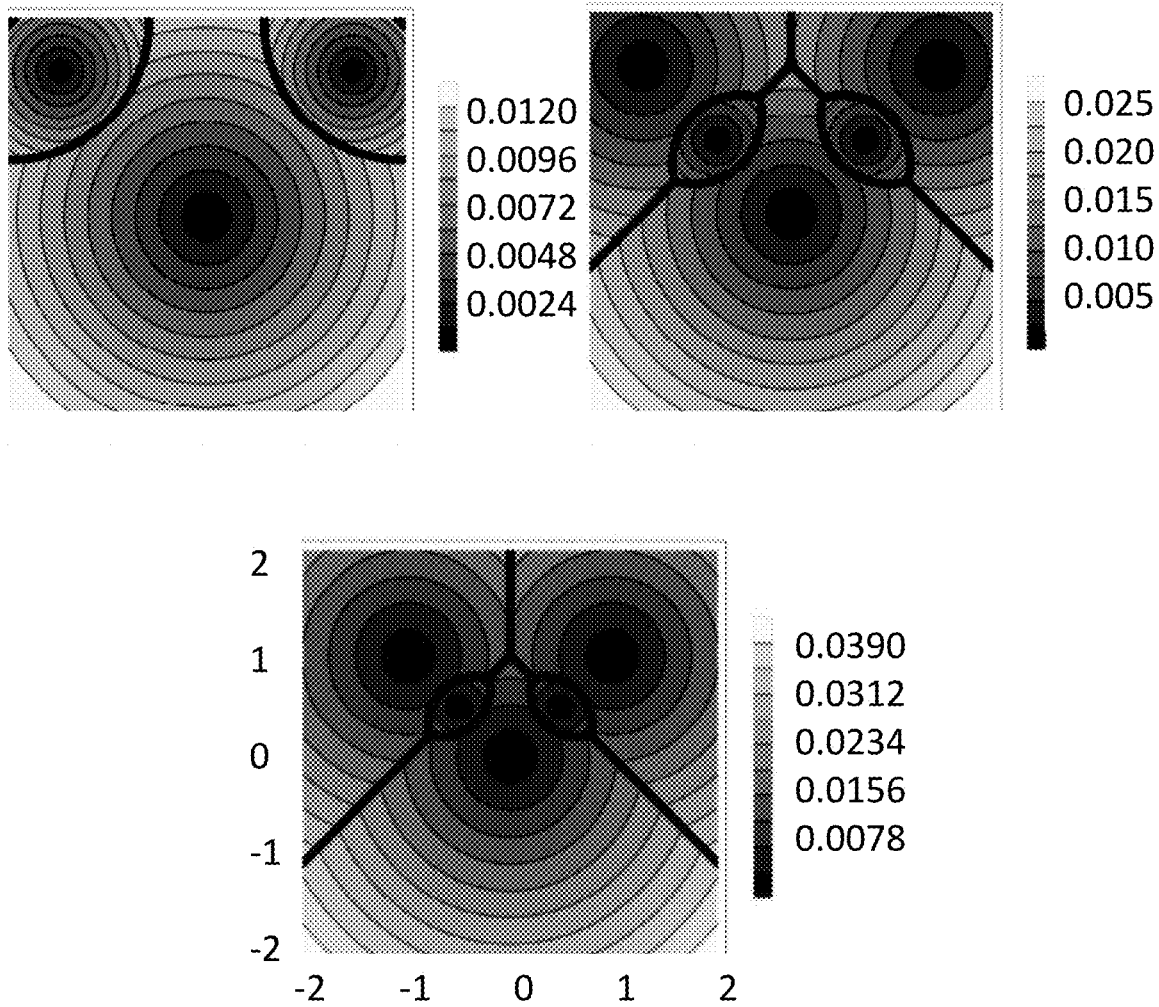
FIG. 17 shows the regions for different values of the speed at which the cameras move, as determined for objects at a predetermined distance, for illustrating embodiments of the present invention.

As illustrated in FIG. 16, the position of the boundaries, and therefore also the shape of each region, depends on the value of d. We also note, however, that the region boundaries for d=2 m and for d=20 m lie at substantially the same position. FIG. 17 shows the regions for different values of the speed of the vehicle, for objects that lie at a distance of 20 m, i.e. respectively for v=5 m/s, v=10 m/s and v=15 m/s left to right and top to bottom. It can be seen that the relative positions of the boundaries and their shape remain substantially the same. In fact, changing the speed has the same effect as zooming in or out on a fixed tessellation, defined by the boundaries between regions indexed by different camera pair selections in accordance with an index (reference) map, wherein the reference map can be defined over at least the image region of the reference camera.

Referring back to FIG. 16, where it was observed that $\mu(x,y; d,\Delta s)$ is substantially the same for d=2 m and d=20 m. It can be noted that the position of the epipole does not depend on d. Furthermore, for d>>$Z_S$, the disparity vector can be approximated by $$\Delta^{i,k}(x, y; d, \Delta s) \approx \frac{Z_i + k\Delta s}{d}(x - e_x^{i,k}, y - e_y^{i,k})^T.$$

This means that when the disparity vector is computed for two distinct distances $d_1, d_2$ both considerably larger than $Z_S$, we have $$\Delta^{i,k}(x, y; d_1, \Delta s) \approx \frac{d_2}{d_1}\Delta^{i,k}(x, y; d_2, \Delta s).$$

Thus, for substantially all points in the image, $\mu(x,y; d_1,\Delta s)$ will be close to $\mu(x,y; d_2,\Delta s)$ scaled by a constant factor $$\frac{d_2}{d_1}.$$

Therefore the boundaries that delimit the regions in $\omega(x,y; d_1,\Delta s)$ will lie close to the boundaries of $\omega(x,y; d_2,\Delta s)$.

Since the index maps all become similar for large d, a limit $$\omega_\infty(x, y; \Delta s) = \lim_{d \to \infty} \omega(x, y; d, \Delta s)$$

can be defined. Note that, although $$\lim_{d \to \infty} \mu(x, y; d, \Delta s) = 0,$$

i.e. the disparity becomes infinitely small for large d, it is still meaningful to define $\omega_\infty(x,y; \Delta s)$. Although the disparity may become very small within in each region, this will not change the position and shape of the regions. In fact, from the approximation of the disparity vector hereinabove, it follows that for d→∞ the boundary between two regions is defined by an equation of the form $$(Z_i/k\Delta s)^2((x-e_x^{i,k})^2+(y-e_y^{i,k})^2)=(Z_j+l\Delta s)^2((x-e_x^{j,l})^2+(y-e_y^{j,l})^2)$$

It follows from this equation that the boundaries between different regions in the index maps consist of line and circle segments, since this equation can be rewritten in a form $a_1(x^2+y^2)+a_2x+a_3y+a_4=0$. When $a_1=0$, this equation defines a line. In particular this will happen when $Z_i=Z_j$, and k=1. A simple example is a planar configuration of cameras where only snapshots taken at k=l=1 are compared to the reference camera. When $a_1 \neq 0$, the equation defines a circle, since $x^2$ and $y^2$ have the same coefficient.

Suppose that the same camera configuration is used in two experiments where only the distance traveled by the vehicle is different, e.g. due to different vehicle speeds and/or a different snapshot timing. For planar camera configurations, it can be shown that $$\omega_\infty\left(\frac{x}{\Delta s_1}, \frac{y}{\Delta s_1}; \Delta s_1\right) = \omega_\infty\left(\frac{x}{\Delta s_2}, \frac{y}{\Delta s_2}; \Delta s_2\right).$$

In other words, by a simple scaling transformation, the index map can be transformed such that the two index maps become equal to each other.

For example, it can be noted that, for a planar camera configuration, all $Z_i$ are zero. As already discussed, a non-planar camera configuration can be transformed to a planar configuration, e.g. by adjusting a timing offset of the camera acquisitions and/or resampling of the acquired images. Also, tilt and yaw components with respect to the principal direction of motion, e.g. the longitudinal direction, can be compensated by a preprocessing of the images, e.g. by warping the images appropriately. Hence, the boundaries between regions are now defined by equations of the form $$(k\Delta s)^2\left(\left(x - \frac{fX_i}{k\Delta s}\right)^2 + \left(y - \frac{fY_i}{k\Delta s}\right)^2\right) = (l\Delta s)^2\left(\left(x - \frac{fX_i}{l\Delta s}\right)^2 + \left(y - \frac{fY_i}{l\Delta s}\right)^2\right)$$

After replacing (x,y) by $$\left(\frac{x}{\Delta s}, \frac{y}{\Delta s}\right)$$

in the equation hereinabove, $\Delta s$ can be eliminated, which shows that in the transformed index maps the boundaries between regions are independent of the traveled distance $\Delta s$.

Therefore, for a planar camera configuration where the line of sight of the reference camera coincides with the driving direction, it is sufficient to compute a single index map that can be used for all car speeds and snapshot timings. In particular, the camera index map $\omega_\infty(x,y; \Delta s)$ can be precomputed for a camera configuration and for one specific value of $\Delta s$, which can be used to determine the appropriate camera pairs for all other values of $\Delta s$. Furthermore, as previously discussed, in a good approximation, $\omega_\infty(x,y; \Delta s)$ can also be used as an index map for a finite distance d, provided the distance between the object and the reference camera is sufficiently large compared to the traveled distance $\Delta s$.

FIG. 17 already demonstrated this scaling property. Although FIG. 17 shows $\mu_\infty(x,y; d,\Delta s)$ for a finite distance of d=20 m, it was clear that for different values the index maps are very similar up to a scaling factor.

Therefore, a map for determining regions of the reference image and for determining, for each region, a corresponding image at a different instant in time, taken by the same or a different camera, such that a minimal disparity is achieved for the combination of the reference image and the corresponding image over each region can be easily constructed by scaling a reference map taking a travelled distance and/or velocity in a longitudinal direction, e.g. a principal direction of movement, into account. Furthermore, as was already described hereinabove, the images may be transformed to take a tilt and/or yaw rotation with respect to the longitudinal direction into account.

In a further example, the theoretical considerations discussed hereinabove are demonstrated by experiments on images captured by a camera configuration mounted on an autobus. Four cameras were placed substantially in a row. Although the cameras were not perfectly aligned and not time synchronized, they were calibrated to remove lens distortion. In this configuration, the cameras were tilted slightly downwards. Exact odometry and speed of the bus were not measured during the image acquisition.

A first experiment demonstrated that the points of zero disparity can be accurately computed from the epipolar lines, without previous knowledge of the odometry (speed and/or position) of the vehicle, e.g. using a more computationally expensive estimation method solely based on the images. The disparity was found to be small around the point of zero disparity. The position of the point of zero disparity also depends on the relative position of the cameras. The principle also can be applied to tilted cameras.

Figure 20:
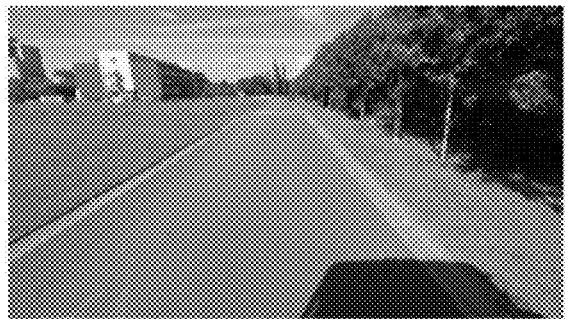
FIG. 20 shows how regions of limited disparity can be defined when comparing images from a left camera and a right camera with a single time step difference between the acquisitions of the images, for illustrating embodiments of the present invention.
Figure 20:
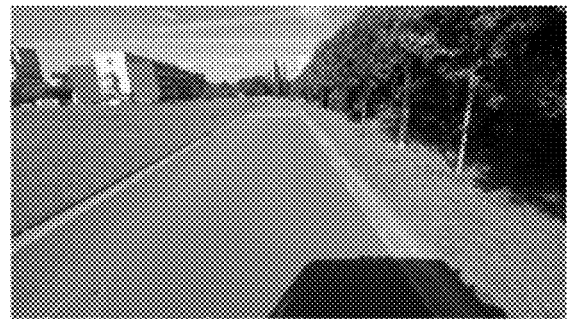
Figure 20:
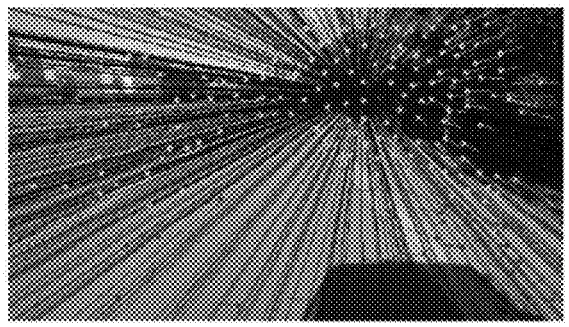
Figure 20:
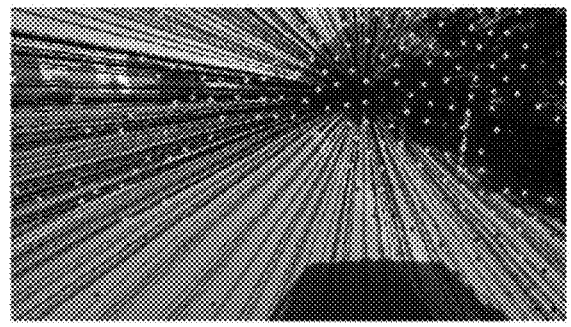
Figure 20:
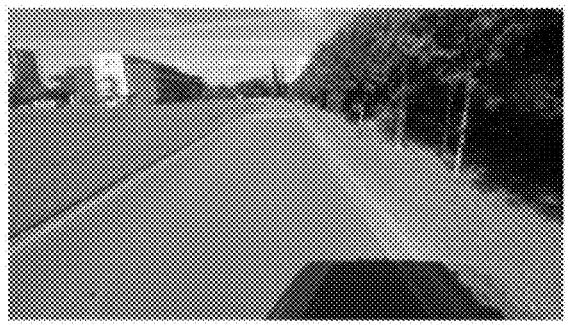

FIG. 20 shows how regions of limited disparity can be defined when comparing images from the left-most camera $C_L$ with the right-most camera. Image 201 shows the snapshot taken by $C_L$ at t, and image 202 the snapshot taken by $C_L$ at t+5. Images 203 and 204 show feature points used to compute epipolar lines, respectively from the left and right image. These feature points were automatically selected by the corner detector described in Shi et al, "Good features to track," in proceedings of IEEE conference on computer vision and pattern recognition, 1994, 593-600. The feature points are indicated by dots while the lines represent epipolar lines. Image 203 also shows the disparity vectors between the feature points of the left and right image. Some feature points were rejected because the disparity vectors are not consistent with the motion of the bus, e.g. when no clear match can be found between the left and right image, for example, where the image intensity is too uniform, or because of image noise.

The epipolar lines were automatically determined from the seminal algorithm described by Hartley in "in defense of the eight-point algorithm," IEEE transactions on pattern analysis and machine intelligence, vol. 19, pp. 580-593. These lines meet at the epipolar point, i.e. the epipole, where the disparity is zero. Image 205 shows the final result: the red component of the left image was merged with the green component of the right image. The cross indicates the position of the epipole. The epipole coincides with the third tree along the road. Close to this point, the disparity between the two images is very small, as can be verified from the merged image. Note that the shadow of the car behaves as a moving object.

Figure 21:
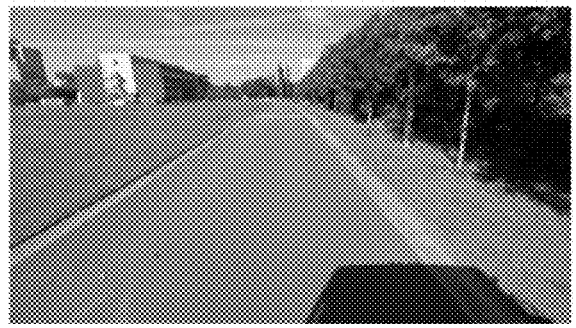
FIG. 21 shows how regions of limited disparity can be defined when comparing images of the left and right camera with a time difference between the acquisitions of three time steps, for illustrating embodiments of the present invention.
Figure 21:
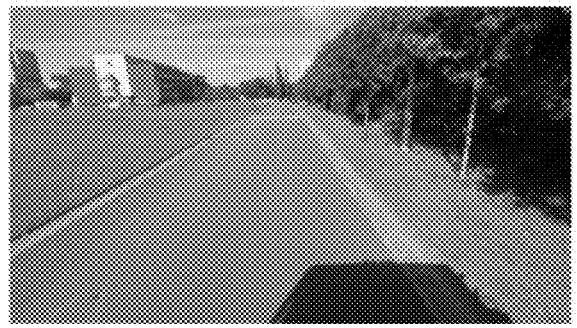
Figure 21:
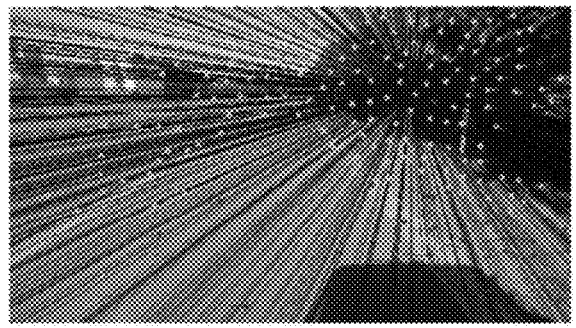
Figure 21:
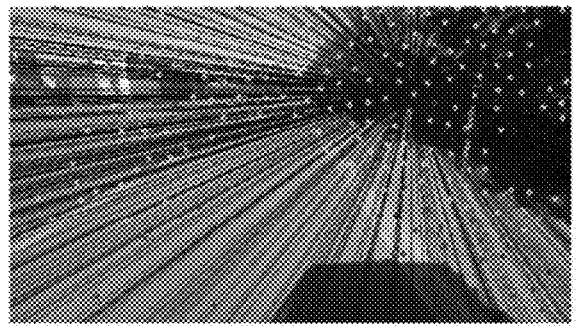
Figure 21:
Figure 22:
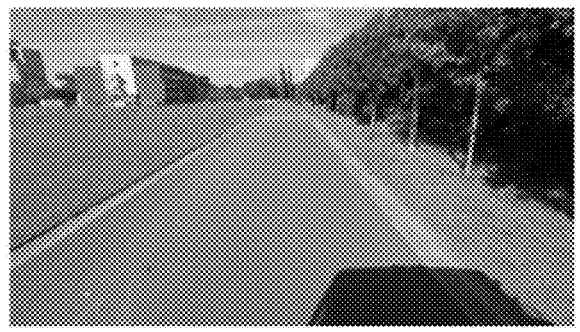
FIG. 22 shows how regions of limited disparity can be defined when comparing images of the left and right camera with a time difference of two time steps, for illustrating embodiments of the present invention.
Figure 22:
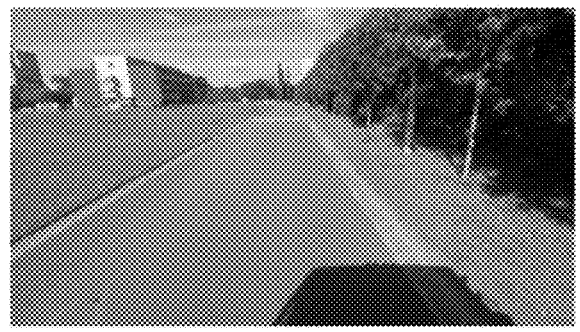
Figure 22:
Figure 22:
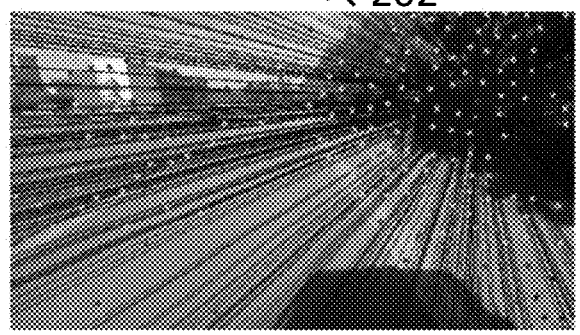
Figure 22:

FIG. 21 shows similar results where the image of $C_L(t)$ is compared to $C_R(t+3)$. The region of low disparity has moved more to the right. The epipole coincides with the position of the second tree along the road. In FIG. 22, where $C_L(t)$ and $C_R(t+2)$ are compared, the region of low disparity has moved even farther to the right, and is centered around the first tree. Any moving object close to the first tree would easily be detected if we compare the two images.

Figure 23:
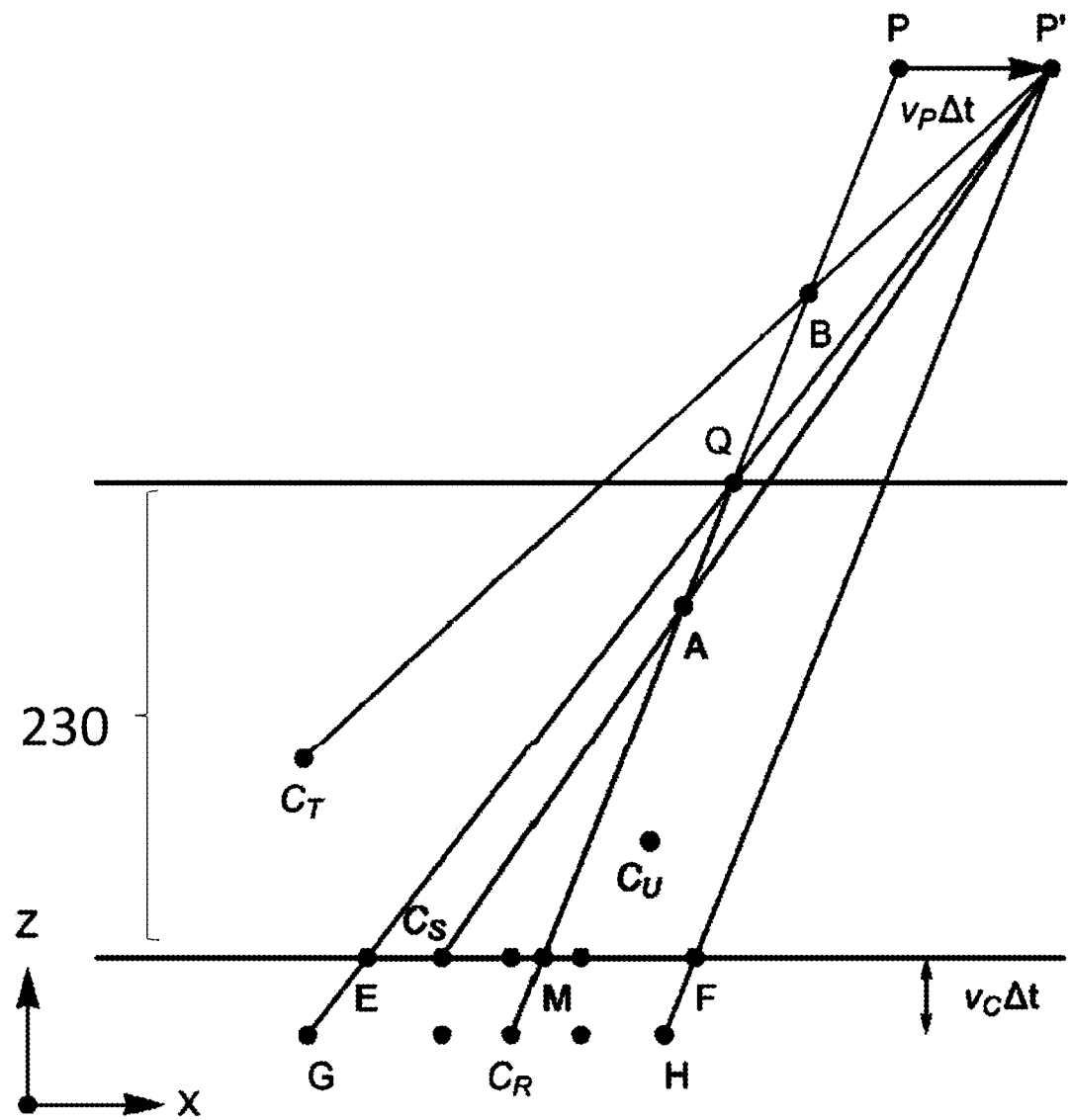
FIG. 23 schematically shows a scenario in which a pedestrian crosses a street in front of the camera system, for illustrating embodiments of the present invention.

In a further example, an application for detecting moving objects, such as pedestrians, by a system mounted on a vehicle, in accordance with embodiments of the present invention, is illustrated. In this example, a linear camera array is used to detect a pedestrian crossing a street at a distance do from a reference camera. FIG. 23 schematically shows a scenario in which a pedestrian at a position P crosses a street at a speed $v_p$ in front of the linear camera array system. The linear array is mounted on a vehicle which drives in the direction indicated by the z-axis. The speed of the vehicle is $v_c$. The velocity of the vehicle is perpendicular to the velocity of the pedestrian. The image of the reference camera $C_R$ taken at a time t is compared to the image taken by a second camera $C_S$ taken at a time t+Δt. When the second image is captured, the pedestrian is at a position P+($v_p$Δt,0).

It is assumed that there is a zone 230 in front of the car which is known to be free of objects. Let $d_F$ denote the depth of this zone relative to the position of the reference camera. Although this zone can be small, in general it will have an area larger than zero, since the vehicle must be able to drive forward without hitting an object, e.g. $d_F \geq v_c \Delta t$.

In this example, it is also assumed that objects in the scene are either static or crossing the street at a speed of least $v_p$.

The position of the second camera $C_S$ can now be determined such that the disparity caused by the moving pedestrian can be distinguished from the parallax caused by the moving vehicle.

As illustrated in FIG. 23, there are camera positions for which this distinction is not possible. Consider, for example, the camera at position $C_T$. Any static object at position B will be projected onto the two same image points as the moving pedestrian. Hence, based on the camera pair $\{C_R, C_T\}$, the difference between a static object at A and a pedestrian at P moving at speed $v_p$ cannot be ascertained. For the camera at position $C_S$, however, to explain the image projections, the static object must be at position A, which is excluded since A lies in the zone 230 that is assumed to be free of objects.

More generally, for any camera $C_S$ located within the triangle defined by the vertices P', G, H, the motion of the pedestrian can only be explained by a static object that lies on the half line starting at Q and passing through $C_R$. Since each point on this half line lies either in the free zone 230 or in the area behind the cameras, which cannot be observed, it follows that any camera within the aforementioned triangle can distinguish the disparity caused by the motion of the pedestrian from the parallax caused by the motion of the camera.

This triangle consists of two parts. For the camera located at $C_S$, the disparity vector caused by P will have the same direction as the disparity vector of a static object. In the image of $C_R$, the projections of P and A move away from the epipole. However, the size of the disparity vector of P will be larger than that of any static object. For the camera located at $C_U$ the direction of the disparity vector of P will be opposite to that of a static object. The projection of P moves towards the epipole of $C_R$, which cannot be explained by the parallax caused by a static object.

The width of the triangle can be calculated at $C_S$, since this allows the maximal spacing between the cameras to be determined. Let $\delta_1$ denote the length of the segment EM and $\delta_2$ the length of the segment MF. A simple calculation shows that $$\delta = \delta_1 + \delta_2 = v_p \Delta t \frac{d_F - v_c \Delta t}{d_o - d_F} + v_p \Delta t,$$

or $$\delta = v_p \Delta t \frac{d_o - v_c \Delta t}{d_o - d_F},$$

where $d_o$ is the depth of the object with respect to the reference camera.

A maximal spacing between the cameras of a linear array can thus be determined, such that a moving pedestrian can likely be detected. First, the special case in which the free zone 230 has a minimal size is considered. In this case, $d_F = v_c \Delta t$ and therefore $\delta = v_p \Delta t$.

To ensure that at a time t+Δt, there is always at least one second camera between E and F, the spacing between the cameras should not be larger than $$\lambda = \frac{\delta}{2} = \frac{v_p \Delta t}{2}.$$

In other words, the maximal spacing between the cameras is half the distance traveled by the pedestrian between two snapshots.

For a more general case, where the free zone is not minimal, it can be assumed that the distance to the object is much larger than the distance traveled by the vehicle, that is, $d_o \gg v_c \Delta t$, and $\delta$ can thus be approximated by $$\delta \approx v_p \Delta t \frac{d_o}{d_o - d_F}.$$

The expression hereinabove contains the depth $d_o$ of the position of the pedestrian. However, it can be assumed that the linear array is configured such that it will only detect pedestrians at a depth not larger than $d_M$. In that case, the maximal spacing between the cameras can be expressed as $$\lambda = \frac{v_p \Delta t}{2} \frac{d_M}{d_M - d_F}.$$

Thus $$\frac{d_M}{d_M - d_F}$$

acts as a scaling factor: when the zone that is assumed to be free of objects becomes larger, the distance between the cameras can be increased. For example, when $$d_F = \frac{d_M}{2}, \lambda = v_p \Delta t,$$

which is twice as large compared to the case where $d_F$ is minimal.

Furthermore, in embodiments in accordance with the present invention, an additional sensor, such as a radar or lidar sensor, may provide additional depth information, and the free zone 230 may be determined to take the additional information acquired by this other means into account. For example, a method and/or system in accordance with embodiments of the present invention may be advantageously used in combination with an alternative motion sensing technique that is particularly suitable, e.g. particularly accurate, for determining moving objects at a close distance. In embodiments of the present invention, the free zone 230 may also be considered as free from moving objects, e.g. pedestrians, with a sufficiently large certainty, due to an analysis of previous image frames, e.g. when the object can be assumed to be at a larger distance.

Figure 24:
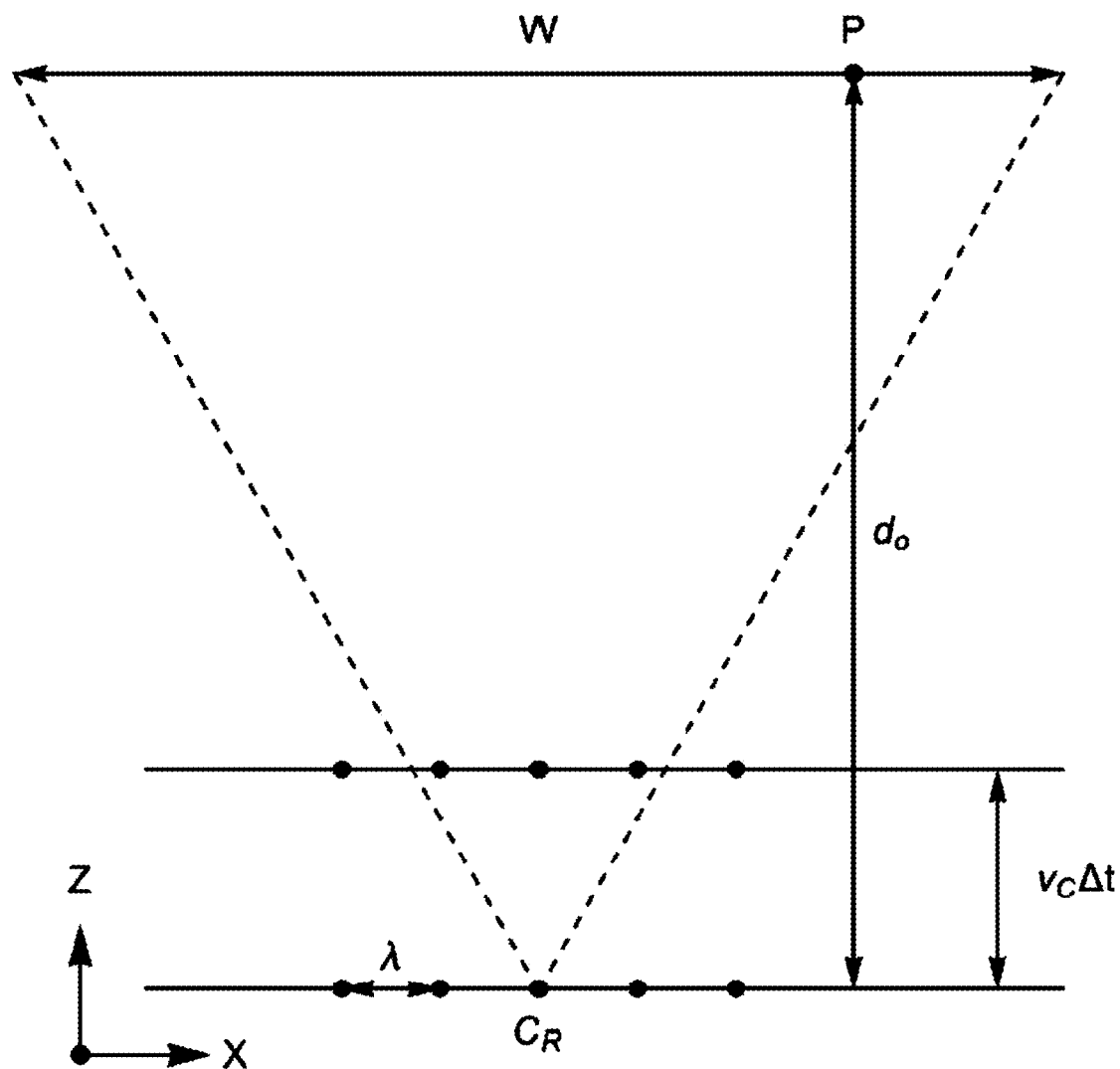
FIG. 24 illustrates a motion of a pedestrian walking along a trajectory of a predetermined length at a predetermined distance, for illustrating embodiments of the present invention.

Once the spacing λ between the cameras is determined, the number of cameras for covering a predetermined range in the scene can be determined. As illustrated in FIG. 24, the motion of a pedestrian walking along a trajectory of length W at a distance $d_o$ may need to be determined. Let k denote the number of cameras that are needed to cover the entire road crossing. We then have $$k = \left\lceil \frac{v_c \Delta t}{\lambda} \frac{W}{d_o} \right\rceil,$$

in which the brackets indicate a rounding up to the next integer operation.

After replacing λ by its maximal value, $$k = \left\lceil 2 \frac{v_c}{v_p} \frac{W(d_M - d_F)}{d_M d_o} \right\rceil$$

is found.

A special case arises when $d_F = 0$. In that case $$k = \left\lceil 2 \frac{v_c}{v_p} \frac{W}{d_o} \right\rceil$$

cameras are needed.

As a concrete example, suppose that pedestrians moving at 5 km/h (or 1.39 m/s) are to be detected at a distance of 20 m along a trajectory that is 10 m long, while the vehicle drives at 30 km/h (or 8.33 m/s). The camera frame rate is 25 Hz. Since, in this example, we are not interested in pedestrians more distant than 20 m, we let $d_M = d_o = 20$ m.

Assume first that nothing is known about the presence of objects in front of the vehicle, such that $d_F = 0$. The maximal spacing between the cameras is then $$\lambda = \left(0.04 \times \frac{1.39}{2}\right) m = 27.8 mm,$$

while $$k = \left\lceil 2 \frac{v_c}{v_p} \frac{W}{d_o} \right\rceil = \left\lceil 2 \times \frac{30}{5} \times \frac{10}{20} \right\rceil = 6.$$

However, if it is known that there are no static obstacles in the first 10 m in front of the vehicle, we have $$\lambda = \frac{v_p \Delta t}{2} \frac{d_M}{d_M - d_F} = \frac{1.39 \times 0.04}{2} \times \frac{20}{20 - 10} = 55.6 mm$$

and $$k = \left\lceil 2 \frac{v_c}{v_p} \frac{W(d_M - d_F)}{d_M d_o} \right\rceil = \left\lceil 2 \times \frac{30}{5} \times \frac{10 \times (20 - 10)}{20 \times 20} \right\rceil = 3.$$

In both cases the camera array is about 166 mm wide, but depending on what is known about the area in front of the vehicle, the number of cameras and the spacing between the camera may differ.

In the above example, the distance between the cameras was calculated while the frame rate was fixed. This does not exclude other possible approaches to the design of a camera array. For example, for a fixed spacing between the cameras, the appropriate frame rate may be calculated that is needed to detect a pedestrian at a given distance. Or, for a fixed frame rate and fixed spacing, the maximum speed of the car may be calculated so that a pedestrian can be detected over a given range of distances.

An analysis similar to what was illustrated hereinabove for road-crossing pedestrians can also be applied to other moving road users, such as cyclists riding along the road, pedestrians walking along sidewalks, pedestrians walking in an arbitrary direction, and so on. The analysis can also be extended to non-linear arrays, to cameras taking snapshots at more than two time instants, or to the use of multiple reference cameras, as will be clear to the skilled person.

In a further example, in accordance with embodiments of the present invention, a first camera equipped with a global shutter may acquire a single reference image at time instance t=0. A second camera may be equipped with a rolling shutter that moves in the horizontal direction along its image plane. When the second camera is moving relative to a world coordinate system, e.g. mounted on and moving at the same speed as a vehicle, the position of its projection center changes continuously for time instances t>0, and so is the epipole position in its image plane with respect to the reference image acquired by the first camera at t=0. By controlling the motion of the rolling shutter of the second camera, e.g. by controlling and optimizing the exposure and readout time of the second camera, or by any other more advanced means of controlled readout of pixel columns, one can ensure that at any time instance t>0, the column of pixels acquired by the second camera either contains the epipole or lies at least close to it, whereby columns of pixels with either zero or small disparity are acquired. For instance, multiple columns of pixels may be grouped into a cropped image of the second camera associated with an acquisition time t>0 and more than one so acquired cropped image may be acquired during the rolling shutter cycle time of the second camera. In an extreme case, a cropped image of the second camera may correspond to a single column of pixels, e.g. a one-dimensional image stripe. More advanced motion control means of the rolling shutter of the second or further cameras may allow a synchronization of shutter speed and the displacement speed for the epipolar point(s) in the image plane(s) associated with the second or further cameras, e.g. by adapting the rolling shutter speed to be proportional to the inverse of the travelled distance $Z_S$.

The invention claimed is:

1. A data processing device for motion segmentation in images obtained by a plurality of cameras that move with respect to a background environment, the data processing device comprising a first input for receiving a temporal sequence of images from the plurality of cameras, and a processor adapted for:

determining at least one pair of corresponding epipoles for at least two images of said temporal sequence of images that are obtained by at least two different cameras at different points in time, defining corresponding image regions of limited image disparity due to parallax around said corresponding epipoles in said at least two images, warping the corresponding image regions to compensate for a rotation of at least one of said at least two cameras obtaining said at least two images at different points in time, and for a misalignment between said at least two cameras, if said rotation and or said misalignment exceeds a threshold value, and applying a motion segmentation algorithm to said corresponding image regions.

2. The data processing device of claim 1, wherein said processor is adapted for, for the at least two images, determining a transformation between the camera positions and/or orientations corresponding to said at least two images, and for determining said epipoles for said at least two images by taking said transformation into account.

3. The data processing device of claim 2, comprising a second input for receiving position, speed, velocity and/or acceleration data of a moving reference frame that moves with respect to a world coordinate frame tied to said background environment, and to which moving reference frame said plurality of cameras are tied, wherein said processor is adapted for determining said transformation taking said data received by said second input into account.

4. The data processing device of claim 1, wherein said processor is adapted for, for a reference image of said temporal sequence of images, determining a plurality of epipoles corresponding to epipoles for at least two other images, of said temporal sequence of images, that are acquired at at least one different point in time by at least one different camera than the reference image, and for determining, for each of said plurality of epipoles, said image region around said epipole in respectively the reference image and the corresponding other image.

5. The data processing device of claim 4, wherein said processor is adapted for, for the at least two images, determining a transformation between the camera positions and/or orientations corresponding to said at least two images, and for determining said epipoles for said at least two images by taking said transformation into account, and wherein said processor is adapted for determining said plurality of epipoles by warping the reference image and/or the at least two other images to correct for a lateral movement component of said transformation and for determining said plurality of epipoles taking a longitudinal movement component of said transformation into account.

6. The data processing device of claim 4, wherein said processor is adapted for, for defining each of said corresponding image regions, determining a boundary of the image region, such that each image pixel of the reference image is assigned to the image region of the nearest of said plurality of epipoles, or such that each image pixel of the reference image is assigned to the image region of an epipole of said plurality of epipoles for the reference image such that the image disparity for that image pixel relative to the other image corresponding to said epipole is the lowest when compared to the image disparities for that image pixel relative to the other images corresponding to the other epipoles.

7. The data processing device of claim 4, wherein said processor is adapted for, for the at least two images, determining a transformation between the camera positions and/or orientations corresponding to said at least two images, and for determining said epipoles for said at least two images by taking said transformation into account, and wherein said processor is adapted for transforming an index map, by at least taking said determined transformation into account, to determine said image regions in said reference image, wherein said transformed index map defines a one-to-one function from said image regions in said reference image to said image regions in said at least two other images.

8. The data processing device of claim 4, wherein, for defining the corresponding image regions, a boundary of each of said image regions is determined such that an upper bound on the image disparity is below a predetermined threshold in each of said image regions.

9. The data processing device of claim 4, wherein said processor is adapted for stitching together a plurality of image regions defined in the corresponding other images and for applying said motion segmentation algorithm to said reference image and to the stitched image of image regions.

10. The data processing device of claim 4, wherein said processor is adapted for stitching together, into a stitched reference image, a plurality of image regions associated with multiple reference cameras, and for stitching together, into a further stitched image, a plurality of image regions corresponding to image regions defined around epipoles of the stitched reference image, and for applying said motion segmentation algorithm to said stitched reference image and to said further stitched image.

11. The data processing device of claim 4, wherein said processor is adapted for applying said motion segmentation algorithm to each image region in the reference image and the corresponding image region in another image separately.

12. The data processing device of claim 1, in which said processor is adapted for applying an algorithm for compensating for a random motion to the images and/or to the corresponding image regions.

13. A system for motion segmentation in images obtained by a plurality of cameras that are movable, in operation, with respect to a background environment, the system comprising a data processing device and said plurality of cameras, the data processing device comprising a first input for receiving a temporal sequence of images from the plurality of cameras, and a processor adapted for:

determining at least one pair of corresponding epipoles for at least two images of said temporal sequence of images that are obtained by at least two different cameras at different points in time, defining corresponding image regions of limited image disparity due to parallax around said corresponding epipoles in said at least two images, warping the corresponding image regions to compensate for a rotation of at least one of said at least two cameras obtaining said at least two images at different points in time, and for a misalignment between said at least two cameras, if said rotation and or said misalignment exceeds a threshold value, and applying a motion segmentation algorithm to said corresponding image regions, wherein plurality of cameras are operably connected to said first input for capturing said temporal sequence of images and providing said temporal sequence of images to said data processing device.

14. The system of claim 13, comprising a position, speed, velocity and/or acceleration sensor for providing a position, a speed, a velocity and/or an acceleration of the system with respect to the background environment to the data processing device.

15. The system of claim 13, in which said system is a vehicle.

16. A computer-implemented method for motion segmentation in images obtained by a plurality of cameras that are moving with respect to a background environment, the method comprising:
- capturing a temporal sequence of images with said plurality of cameras;
- for at least two images, of said temporal sequence of images that are obtained by at least two different cameras at different points in time, determining a pair of corresponding epipoles,
- defining corresponding image regions of limited image disparity due to parallax around said pair of corresponding epipoles in said at least two images,
- warping the corresponding image regions to compensate for a rotation of at least one of said at least two cameras obtaining said at least two images at different points in time, and for a misalignment between said at least two cameras, if said rotation or said misalignment exceeds a threshold value, and
- applying a motion segmentation algorithm to said corresponding image regions.

17. A method according to claim 16, further comprising:
- selecting camera pairs from said plurality of cameras in accordance to an index map,
- defining corresponding image regions of limited image disparity due to parallax around at least one pair of corresponding epipoles for images obtained by each of the selected camera pairs.

* * * * *